United States Patent
Mizusaki et al.

(10) Patent No.: US 10,907,101 B2
(45) Date of Patent: Feb. 2, 2021

(54) LIQUID CRYSTAL CELL AND LIQUID CRYSTAL DISPLAY

(71) Applicant: SHARP KABUSHIKI KAISHA, Sakai (JP)

(72) Inventors: Masanobu Mizusaki, Sakai (JP); Hiroshi Tsuchiya, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 125 days.

(21) Appl. No.: 16/136,252

(22) Filed: Sep. 20, 2018

(65) Prior Publication Data
US 2019/0093016 A1    Mar. 28, 2019

(30) Foreign Application Priority Data
Sep. 22, 2017 (JP) .................. 2017-182463

(51) Int. Cl.

| | |
|---|---|
| *C09K 19/56* | (2006.01) |
| *C09K 19/30* | (2006.01) |
| *C09K 19/02* | (2006.01) |
| *G02F 1/137* | (2006.01) |
| *G02F 1/1337* | (2006.01) |

(Continued)

(52) U.S. Cl.
CPC .......... *C09K 19/56* (2013.01); *C09K 19/0208* (2013.01); *C09K 19/0216* (2013.01); *C09K 19/3066* (2013.01); *G02F 1/137* (2013.01); *C09K 2019/0466* (2013.01); *C09K 2019/3422* (2013.01); *C09K 2323/00* (2020.08); *C09K 2323/02* (2020.08); *C09K 2323/027* (2020.08); *G02F 1/1339* (2013.01);
(Continued)

(58) Field of Classification Search
CPC ................ C09K 19/56; C09K 19/3066; C09K 19/0216; C09K 19/0208; C09K 2019/0466; G02F 1/1339; G02F 1/133788; G02F 1/133723; G02F 2001/13775; Y10T 428/10; Y10T 428/1005; Y10T 428/1023
USPC ......... 428/1.1, 1.2, 1.26; 349/123, 132, 186; 252/299.01; 525/479
See application file for complete search history.

(56) References Cited

U.S. PATENT DOCUMENTS

2008/0029736 A1 * 2/2008 Saito ...................... C09K 19/42
252/299.63

FOREIGN PATENT DOCUMENTS

| WO | 2015/050135 A1 | 4/2015 | |
|---|---|---|---|
| WO | WO-2015050135 A1 * | 4/2015 | ........... C08G 73/105 |

* cited by examiner

*Primary Examiner* — Ruiyun Zhang
(74) *Attorney, Agent, or Firm* — ScienBiziP, P.C.

(57) ABSTRACT

A liquid crystal cell includes a pair of facing substrates having a photo-alignment film, and a liquid crystal layer. The liquid crystal material contains a liquid crystal compound having a structure represented by any of the following chemical formula (1-1) and chemical formula (1-2):

$$A_1\text{-}C_nF_{2n}\text{—}X_1\text{-}A_2 \quad (1\text{-}1)$$

$$A_1\text{-}X_1\text{—}C_nF_{2n+1} \quad (1\text{-}2)$$

in the chemical formula (1-1), $A_1$ is a phenyl group, a phenylene group, a naphthyl group, a naphthylene group, a cyclohexyl group, or a cyclohexylene group; $A_2$ is a phenyl group, a phenylene group, a naphthyl group, or a naphthylene group (provided that a hydrogen atom in functional groups $A_1$ and $A_2$ is optionally substituted by a fluoro group, a chloro group, a bromo group, a methyl group, or an ethyl group); $X_1$ is an oxygen atom or a direct bond; and n is an (Continued)

integer of 1 to 6. The photo-alignment film is obtained by subjecting a polymer film to a photo-alignment treatment.

14 Claims, 3 Drawing Sheets

(51) Int. Cl.
 *G02F 1/1339* (2006.01)
 *C09K 19/04* (2006.01)
 *C09K 19/34* (2006.01)
(52) U.S. Cl.
 CPC .. *G02F 1/133723* (2013.01); *G02F 1/133788* (2013.01); *G02F 2001/13775* (2013.01)

LIQUID CRYSTAL CELL AND LIQUID CRYSTAL DISPLAY

CROSS REFERENCE TO RELATED APPLICATION

This application claims priority from Japanese Patent Application No. 2017-182463 filed on Sep. 22, 2017. The entire contents of the priority application are incorporated herein by reference.

TECHNICAL FIELD

The present invention relates to a liquid crystal cell and a liquid crystal display.

BACKGROUND

A liquid crystal display has a liquid crystal panel as a display part that displays information such as images. The liquid crystal panel has mainly a liquid crystal cell in which a liquid crystal layer is sealed between a pair of substrates, and a pair of polarizing plates stuck on both sides of the liquid crystal cell. An alignment of a liquid crystal compound in the liquid crystal layer is controlled by an electric field applied to the liquid crystal layer, whereby an amount of light passing through the liquid crystal layer is adjusted to display an image corresponding to the adjusted amount of light.

A frame-shaped sealing material is interposed between the substrates of the liquid crystal cell such that the sealing material surrounds the liquid crystal layer. The substrates each have an alignment film on a side brought into contact with the liquid crystal layer. As the alignment film, a photo-alignment film including a polyimide polymer having a cyclobutane ring, which is a photolytic, photoreactive functional group, is utilized (see, for example, International Publication WO 2015/050135).

As the sealing material, for example, a mixed resin of an acrylic resin, obtained by photo-polymerization of a (meth) acrylic monomer using a photoradical polymerization initiator, with an epoxy resin, obtained by thermal polymerization of a curing agent such as an amine curing agent and an epoxy monomer, is utilized. This kind of sealing material is a so-called non-solvent type, and thus unreacted components and compounds having a low degree of polymerization easily remain in the sealing material. Consequently, moisture, existing on the outside of the liquid crystal cell, moves through the sealing material together with the remaining unreacted components (particularly an amphipathic epoxy monomer), and may sometimes intrude into the liquid crystal layer. In particular, when a line width of the sealing material is thinned in order to narrow a frame (for example, when the line width is made 1.0 mm or less), the amount of moisture, which intrudes into the liquid crystal layer together with the unreacted components, increases.

It is supposed that when the moisture intrudes into the liquid crystal layer as described above, the liquid crystal compound is hydrolyzed by the moisture intruding, in a case where the liquid crystal compound in the liquid crystal layer has a group: —$CH_2$—O—, thus resulting in generation of a compound having a group: —$CH_2$—OH (methylol group).

Meanwhile, in the photo-alignment film, an imide compound having a maleimide group is formed by photocleavage of a cyclobutane ring. The imide compound has a comparatively low molecular weight, and thus it is easily eluted into the liquid crystal layer. As shown in FIG. 1, it is supposed that the imide compound (a-1) eluted into the liquid crystal layer forms a hydrogen bond with the compound (a-2) having the group: —$CH_2$—OH, and is converted into a compound (a-3) in a stable state in the liquid crystal layer. As a consequence, the alignment of the liquid crystal compound in the liquid crystal layer is disturbed, and display defects such as bright spots, burning, spotting, and irregularity may problematically occur on the display part on the liquid crystal panel (liquid crystal cell).

When the liquid crystal layer has a low phase transition temperature of 70° C. to lower than 80° C., a viscosity of the liquid crystal layer decreases if a working temperature of the liquid crystal cell is high (for example, 60° C.). When the viscosity of the liquid crystal layer decreases as described above, the moisture from the outside and the unreacted components (particularly, the epoxy monomer) in the sealing material are easily dissolved in the liquid crystal layer, and the imide compound generated by decomposition of the cyclobutane ring is easily eluted into and diffused in the liquid crystal layer. For that reason, the display defects such as bright spots, burning, spotting, and irregularity further easily occur.

SUMMARY

An object of the present invention is to provide a liquid crystal cell configured to suppress occurrence of display defects such as bright spots.

A liquid crystal cell according to the present invention includes: a pair of substrates, which face each other and have a photo-alignment film on at least one facing surface; and a liquid crystal layer interposed between the substrates. In the liquid crystal cell, a liquid crystal material forming the liquid crystal layer contains a liquid crystal compound having a structure represented by any of the following chemical formula (1-1) and chemical formula (1-2), and the photo-alignment film is obtained by subjecting a polymer film including a polyimide polymer having a cyclobutane ring structure to a photo-alignment treatment.

$$A_1\text{-}C_nF_{2n}\text{—}X_1\text{-}A_2 \qquad (1\text{-}1)$$

$$A_1\text{-}X_1\text{—}C_nF_{2n+1} \qquad (1\text{-}2)$$

In the chemical formula (1-1) and the chemical formula (1-2), $A_1$ is a phenyl group, a phenylene group, a naphthyl group, a naphthylene group, a cyclohexyl group, or a cyclohexylene group; $A_2$ is a phenyl group, a phenylene group, a naphthyl group, or a naphthylene group (provided that the hydrogen atom in the functional groups $A_1$ and $A_2$ may be substituted by a fluoro group, a chloro group, a bromo group, a methyl group, or an ethyl group); $X_1$ is an oxygen atom or a direct bond; and n is an integer of 1 to 6.

In the liquid crystal cell described above, the polyimide polymer utilized for the photo-alignment film may include a polymer represented by the following chemical formula (2):

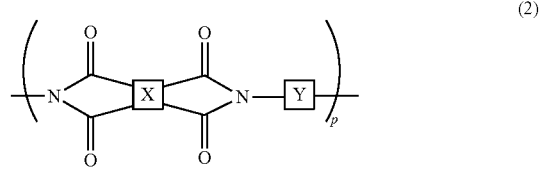

(2)

In the chemical formula (2), p is the degree of polymerization and an integer of 1 or more; X has a structure represented by the following chemical formula (3-1) or chemical formula (3-2); and Y has a structure represented by any of chemical formula (4-1) to chemical formula (4-12):
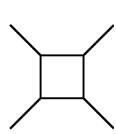 (3-1)
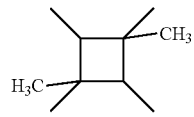 (3-2)
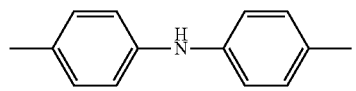 (4-1)
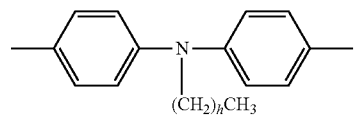 (4-2)
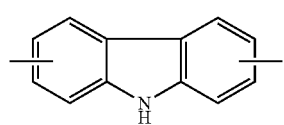 (4-3)
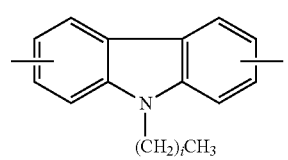 (4-4)
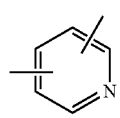 (4-5)
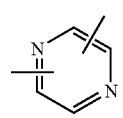 (4-6)
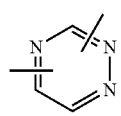 (4-7)
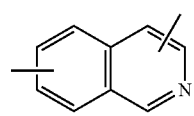 (4-8)
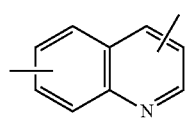 (4-9)
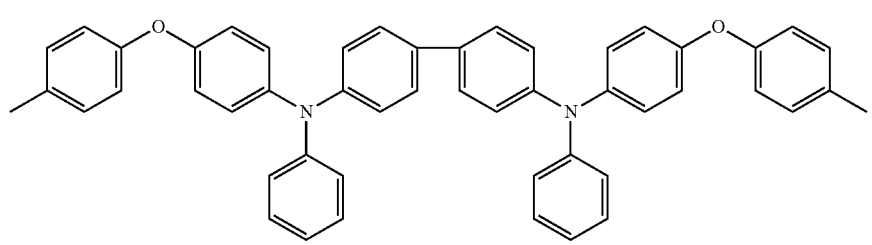 (4-10)
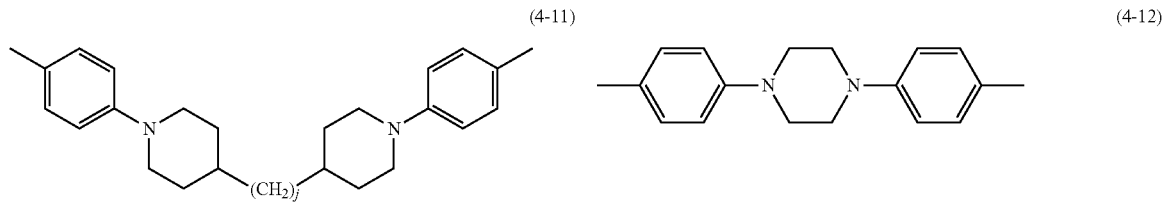 (4-11) (4-12)

In the chemical formula (4-2), h is an integer of 0 to 3; in the chemical formula (4-4), i is an integer of 0 to 3; and in the chemical formula (4-11), j is an integer of 0 to 3.

In the liquid crystal cell described above, X in the chemical formula (2) may have a structure represented by the chemical formula (3-1), and Y may have a structure represented by any of the chemical formula (4-1) and the chemical formula (4-2).

In the liquid crystal cell described above, the photo-alignment film may further include a (meth)acrylamide polymer.

In the liquid crystal cell described above, the (meth) acrylamide polymer may include a polymer represented by any of the following chemical formula (5-1) and chemical formula (5-2):

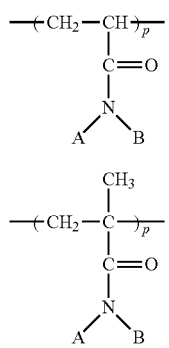

(5-1)

(5-2)

In the chemical formula (5-1) and the chemical formula (5-2), A and B are independent from each other and are each H, $-C_nC_{2n+1}$ where n is an integer of 1 to 3, $-(CH_2)_mNX_2Y_2$ where m is an integer of 1 to 6, $X_2$ and $Y_2$ are independent from each other and are each H or $-C_zH_{2z+1}$ where z is an integer of 1 to 3, or $-(CH_2)_mOH$; and p is the degree of polymerization and an integer of 1 or more.

In the liquid crystal cell described above, the (meth) acrylamide polymer may include a polymer represented by any of the following chemical formula (6-1) to chemical formula (6-3):

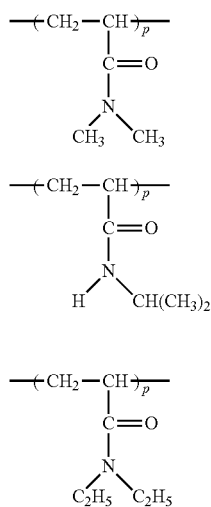

(6-1)

(6-2)

(6-3)

In the chemical formula (6-1) to the chemical formula (6-3), p is the degree of polymerization and an integer of 1 or more.

In the liquid crystal cell described above, the (meth) acrylamide polymer may be contained in a content (% by mass) of more than 0% by mass and less than 30% by mass relative to 100% by mass of the total of the polyimide polymer and the (meth)acrylamide polymer.

In the liquid crystal cell described above, the liquid crystal compound may have a structure represented by any of the following chemical formula (7-1) to chemical formula (7-3):

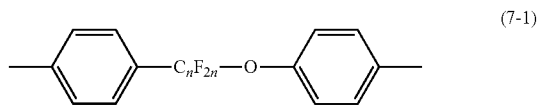

(7-1)

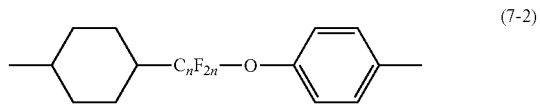

(7-2)

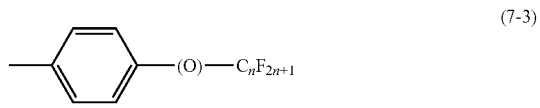

(7-3)

In the chemical formula (7-1) to the chemical formula (7-3), the hydrogen atom in the phenyl group or the cyclo-hexyl group is optionally substituted by a fluoro group, a chloro group, a bromo group, a methyl group, or an ethyl group; and n is an integer of 1 to 6.

In the liquid crystal cell described above, the liquid crystal compound may include a compound represented by the following chemical formula (8):

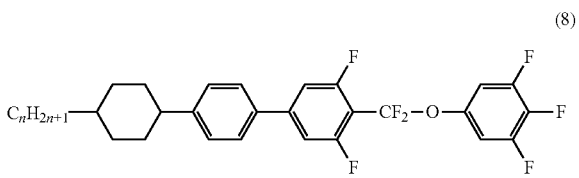

(8)

In the chemical formula (8), n is an integer of 0 to 15.

In the liquid crystal cell described above, the liquid crystal material forming the liquid crystal layer may have a Tni of 80° C. or higher and 110° C. or lower.

In the liquid crystal cell described above, it is preferable that the liquid crystal compound utilized for the liquid crystal material does not include a structure represented by the following chemical formula (9):

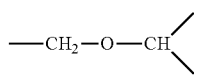

(9)

In the liquid crystal cell described above, the photo-alignment film may include a horizontal photo-alignment film, which horizontally or substantially horizontally aligns the liquid crystal compound relative to a substrate surface of the substrate.

In the liquid crystal cell described above, the liquid crystal cell has a display mode of any of TN, ECB, IPS, and FFS.

The liquid crystal cell described above may further include a sealing material interposed between the substrates in a state of surrounding the liquid crystal layer. In the liquid crystal cell described above, the sealing material may include a polymer of an epoxy monomer and a polymer of a (meth)acrylic monomer.

The liquid crystal display according to the present invention includes any one of the liquid crystal cells described above.

The present invention can provide a liquid crystal cell configured to suppress the occurrence of display defects such as bright spots.

DETAILED DESCRIPTION (Liquid Crystal Display)

Figure 1:
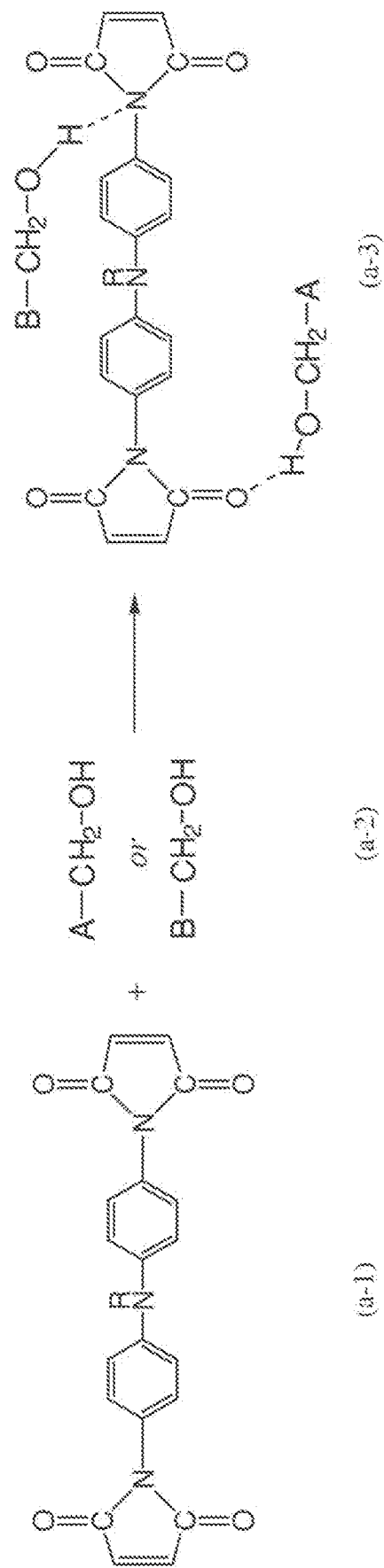
FIG. 1 is an explanatory diagram showing a state in which an imide compound, eluted into a liquid crystal layer from a photo-alignment film, forms a hydrogen bond with a decomposition product of a liquid crystal compound, resulting in a stabilized state.
Figure 2:
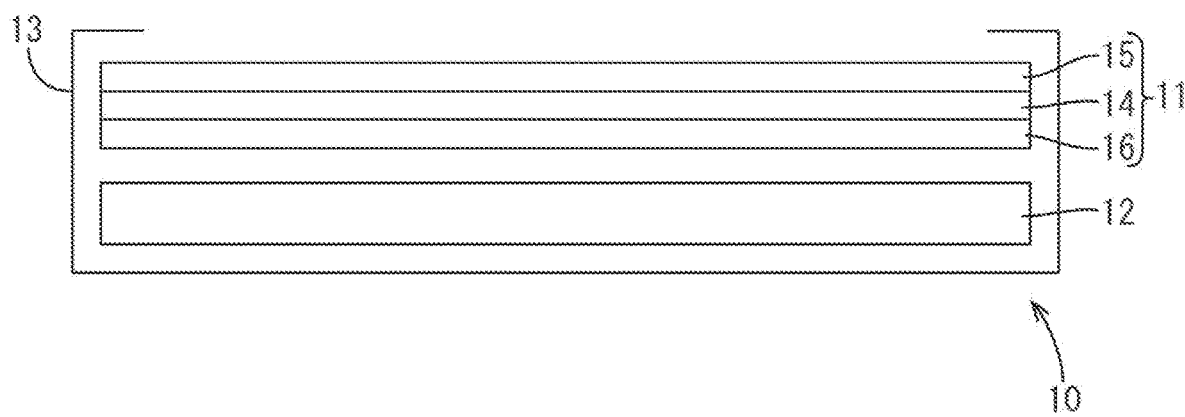
FIG. 2 is an explanatory diagram schematically showing a structure of a liquid crystal display according to a first embodiment.

An embodiment of the present invention is described below referring to the drawings. FIG. 2 is an explanatory diagram schematically showing a structure of a liquid crystal display 10 according to one embodiment. The liquid crystal display 10 includes mainly a liquid crystal panel 11, and a back light 12 that supplies light to the liquid crystal panel 11. The liquid crystal panel 11 and the back light 12 are housed in a predetermined housing 13.

The liquid crystal panel 11 mainly includes a liquid crystal cell 14 and a pair of polarizing plates 15 and 16 stuck on both sides of the liquid crystal cell 14.

(Liquid Crystal Cell)

Figure 3:
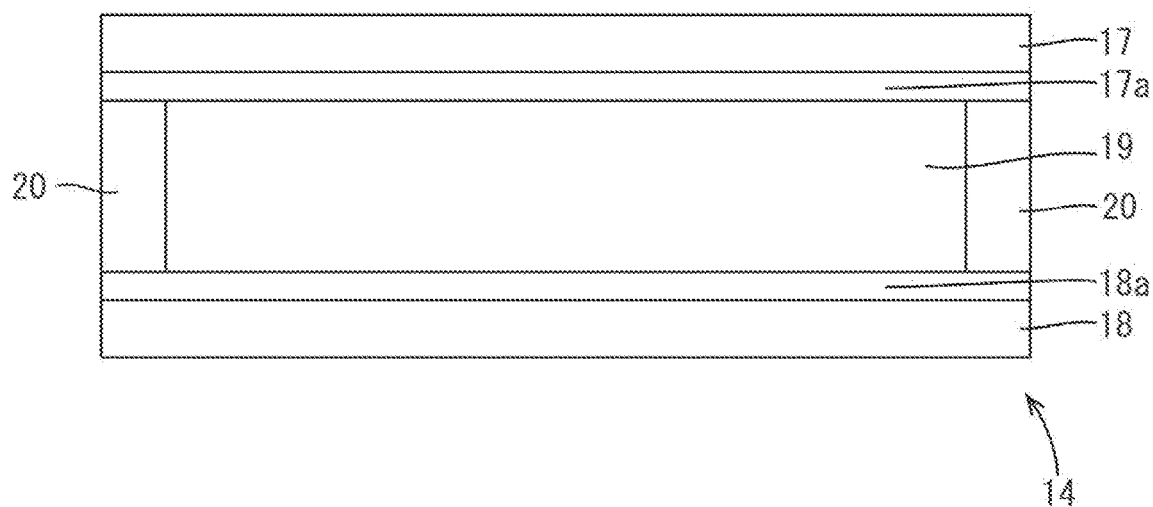
FIG. 3 is an explanatory diagram schematically showing a structure of a liquid crystal cell of the first embodiment.

FIG. 3 is an explanatory diagram schematically showing a structure of the liquid crystal cell 14. The liquid crystal cell 14 includes: a pair of substrates 17 and 18, which face each other and have photo-alignment films 17a and 18a on the facing surfaces thereof; a liquid crystal layer 19 interposed between the substrates 17 and 18; and a sealing material 20 interposed between the substrates 17 and 18 in a state of surrounding the liquid crystal layer 19. One substrate 17 of the pair of substrates 17 and 18 is an array substrate 17, and the other substrate 18 is a counter substrate 18.

(Substrate)

The array substrate 17 includes a thin film transistor (TFT) formed on a transparent supporting substrate (for example, a glass substrate), in which the photo-alignment film 17a is formed on a surface facing the other counter substrate 18. The counter substrate 18 includes a color filter (CF), and the like, formed on a transparent supporting substrate (for example, a glass substrate), in which the photo-alignment film 18a is formed on a surface facing the other array substrate 17. The photo-alignment films 17a and 18a are formed on the substrates 17 and 18, respectively, while being brought into contact with the liquid crystal layer 19.

The photo-alignment films 17a and 18a include a polymer film, which expresses an alignment-regulating property exerting an effect to the liquid crystal compound so as to arrange the direction of the liquid crystal compound to a predetermined direction by irradiation of given light such as polarized ultraviolet light (photo-alignment treatment). In particular, the photo-alignment films 17a and 18a in the present embodiment include a horizontal photo-alignment film, which horizontally or substantially horizontally aligns the liquid crystal compound (liquid crystal molecule) relative to the substrate surfaces of the substrates 17 and 18. The photo-alignment films 17a and 18a are described in detail later.

A display mode of the liquid crystal cell 14 is not particularly limited as long as the horizontal photo-alignment film is utilizable, and it is appropriately selected depending on the object. The display mode of the liquid crystal cell 14 may include, for example, an in-plane switching (IPS) mode, a fringe field switching (FFS) mode, a twisted nematic (TN) mode, and an electrically controlled birefringence (ECB) mode.

When the liquid crystal cell 14 is in the IPS mode, FFS mode or the like, a counter electrode is formed on the array substrate 17 together with a pixel electrode including a transparent conductive film of indium tin oxide (ITO) or the like. In this case, electrodes are not formed on the counter substrate 18. On the other hand, when the liquid crystal cell 14 is in the TN mode, ECB mode or the like, the pixel electrode is formed on the array substrate 17 and the counter electrode is formed on the counter substrate 18.

(Photo-Alignment Film)

The photo-alignment film includes a polymer film including a polyimide polymer having a cyclobutane ring structure. The polymer film has been subjected to the photo-alignment treatment. The photo-alignment treatment is a step in which predetermined light (for example, polarized ultraviolet light) is emitted to the polymer film, whereby an alignment-regulating property, which arranges the direction of the liquid crystal compound to a predetermined direction, is expressed to the polymer film. In the photo-alignment treatment, when predetermined light is emitted to the polymer film, the cyclobutane ring structure in the polymer film is decomposed, and the structure of the polyimide polymer is changed such that the alignment-regulating property is expressed. The polyimide polymer includes, for example, a polymer represented by the following chemical formula (2):

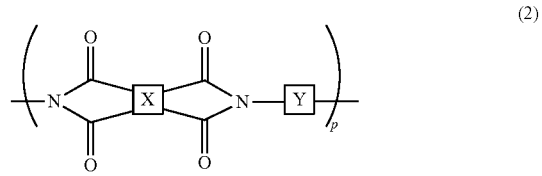

(2)

In the chemical formula (2), p is the degree of polymerization and an integer of 1 or more; X has a structure represented by the following chemical formula (3-1) or chemical formula (3-2); and Y has a structure represented by any of chemical formula (4-1) to chemical formula (4-12):

As the polyimide polymer, for example, a polymer represented by the formula (2) where X has a structure represented by the chemical formula (3-1) and Y has a structure represented by the chemical formula (4-1) or the chemical formula (4-2) is preferable.

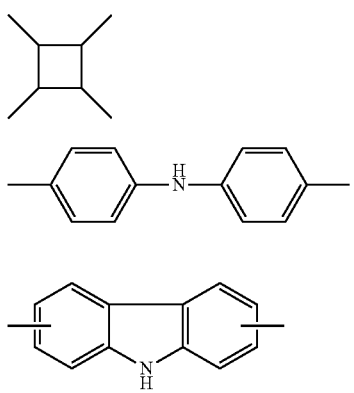

(3-1)

(3-2)

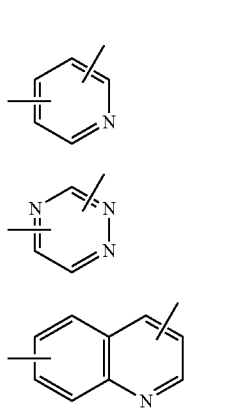

(4-1)

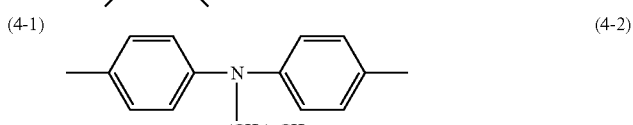

(4-2)

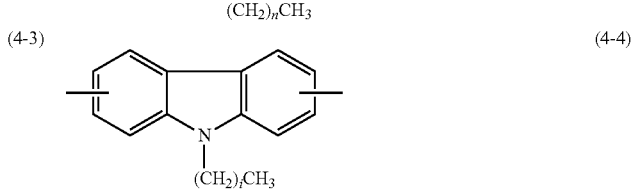

(4-3)

(4-4)

(4-5)

(4-6)

(4-7)

(4-8)

(4-9)

(4-10)

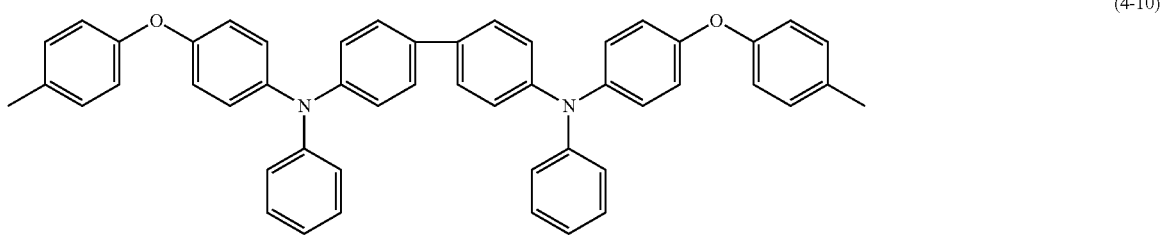

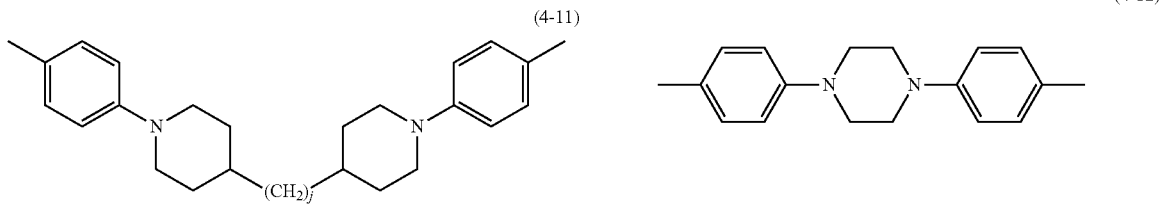

(4-11)

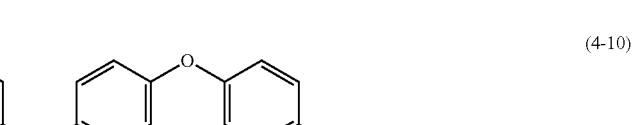

(4-12)

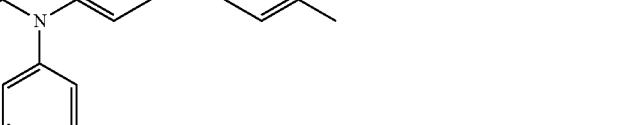

In the chemical formula (4-2), h is an integer of 0 to 3; in the chemical formula (4-4), i is an integer of 0 to 3; and in the formula (4-11), j is an integer of 0 to 3.

The polyimide polymer includes an appropriately imidized polyamic acid having the cyclobutane ring structure. The degree of imidization of the polyimide polymer is not particularly limited as long as the objects of the present invention are not impaired, and it is, for example, set to 45% or more.

Figure 4:
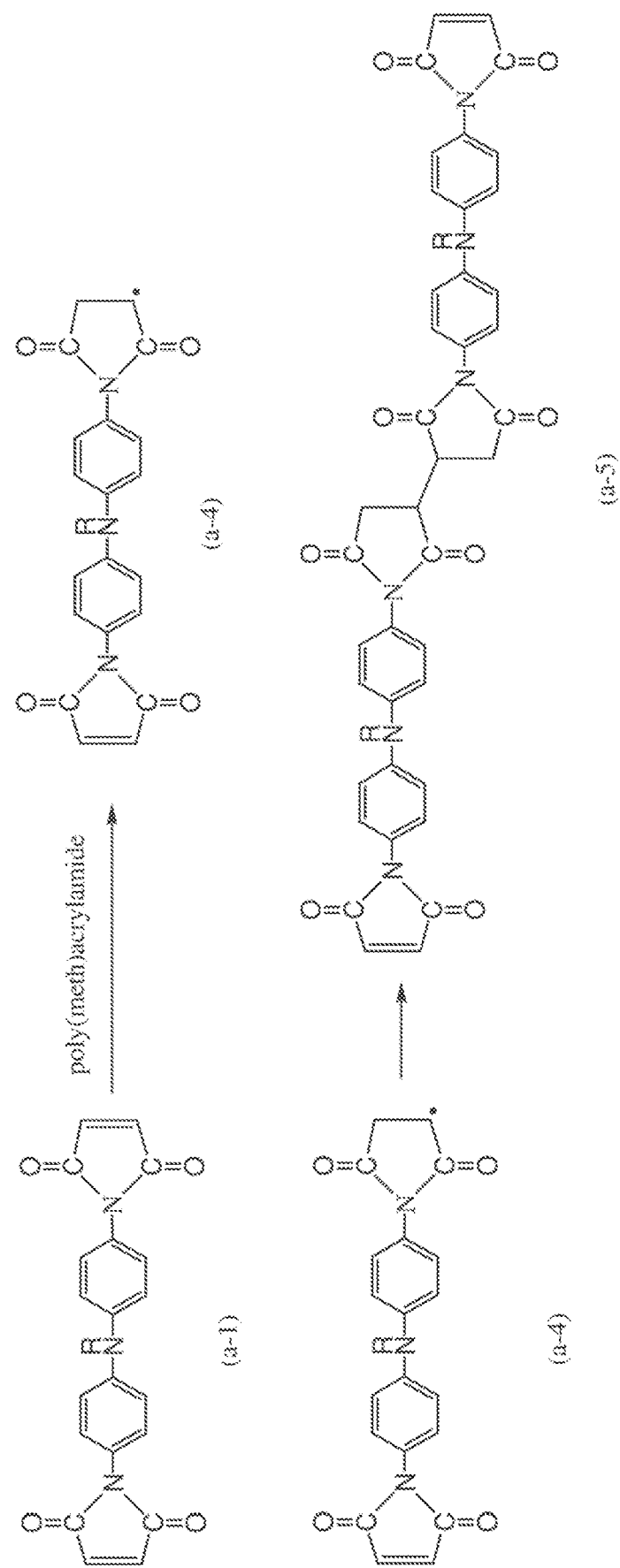
FIG. 4 is an explanatory diagram showing a mechanism in which an imide compound formed from a decomposition product of a photo-alignment film is converted into a polymer, which is not eluted into a liquid crystal layer, by a (meth)acrylamide polymer in the photo-alignment film.

The photo-alignment film preferably further includes a (meth)acrylamide polymer. The (meth)acrylamide polymer has a function which causes a hydrogen-drawing reaction to decomposition products (imide compounds), generated from the polyimide polymer after the photo-alignment treatment, in the photo-alignment film. As shown in FIG. 4, the (meth)acrylamide polymer causes a so-called hydrogen-drawing reaction, in which a hydrogen atom is drawn from the maleimide group in the imide compound (a-1), in the photo-alignment films 17*a* and 18*a* to generate an imide compound (a-4) having a radical. Then, the imide compounds (a-4) having the racial are cross-linked to each other to form a polymer (a-5). As described above, the imide compound (a-1) is turned into the polymer (a-5) having a rather large molecular weight, whereby elution of the imide compound (a-1), which is a photolyte of the polyimide polymer, into the liquid crystal layer 19 from the photo-alignment films 17*a* and 18*a* can be suppressed.

The (meth)acrylamide polymer has a high flexibility and thus it can be three-dimensionally distributed in the vicinity of the cyclobutane ring of polyimide monomer in the photo-alignment film. A case of a low molecular weight compound is not preferable, because the possibility that the compound itself is eluted into the liquid crystal layer is increased. As the functional group that can cause the hydrogen-drawing reaction, an amino group (amido group) is preferable.

The (meth)acrylamide polymer includes, for example, a polymer represented by any of the following chemical formula (5-1) and chemical formula (5-2).

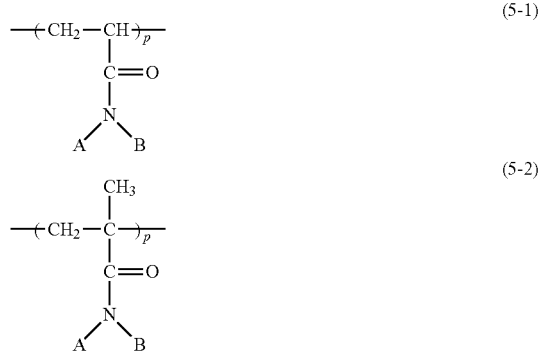

In the chemical formula (5-1) and the chemical formula (5-2), A and B are independent from each other and are each H, $-C_nC_{2n+1}$ where n is an integer of 1 to 3, $-(CH_2)_mNX_2Y_2$ where m is an integer of 1 to 6, $X_2$ and $Y_2$ are independent from each other and are each H or $-C_zH_{2z+1}$ where z is an integer of 1 to 3, or $-(CH_2)_mOH$; and p is the degree of polymerization and an integer of 1 or more.

More specifically, the (meth)acrylamide polymer includes preferably a polymer represented by any of the following chemical formula (6-1) to chemical formula (6-3).

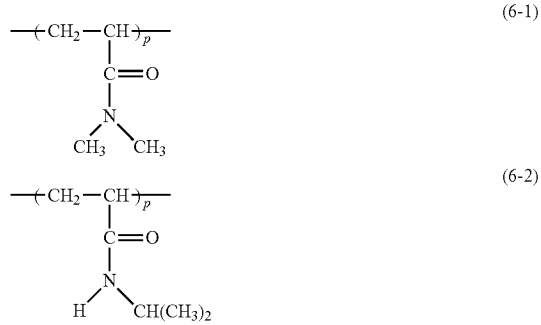

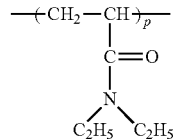

In the chemical formula (6-1) to the chemical formula (6-3), p is the degree of polymerization and an integer of 1 or more.

The content (% by mass) of the (meth)acrylamide polymer in the photo-alignment film is not particularly limited as long as the objects of the present invention are not impaired, and it is appropriately set depending on the object. For example, the content is preferably more than 0% by mass and less than 30% by mass relative to 100% by mass of the total of the polyimide polymer and the (meth)acrylamide polymer.

As shown in FIG. 2, the present embodiment has a structure in which the photo-alignment films 17*a* and 18*a* are formed on both surfaces (facing surfaces) of the pair of substrates 17 and 18. In another embodiment, the photo-alignment film may be formed only on the facing surface of at least one substrate of the pair of substrates. Another alignment film, which is not the photo-alignment film in the present embodiment, may be formed on the facing surface of the substrate on which the photo-alignment film is not formed.

In a step of forming the photo-alignment film, first, an uncured alignment agent, which contains the polyimide polymer and the like and has flowability, is coated on the surfaces (facing surfaces) of the substrates 17 and 18 using a coater. The coated product (polymer film) is subjected to pre-baking (for example, a heat treatment at 80° C. for 2 minutes), followed by a photo-alignment treatment in which predetermined light is emitted. During the photo-alignment treatment, when the coated product is subjected to baking (for example, a heat treatment at 200° C. for 20 minutes), a photo-alignment film having the alignment-regulating property with which the liquid crystal compound is aligned in a predetermined direction is obtained. Subsequently to the pre-baking, the baking may be performed, and then the photo-alignment treatment may be performed. The baking may be performed multiple times (twice or more). When the coated product of the alignment agent is subjected to the pre-baking or the baking, the polyamic acid is appropriately imidized.

(Sealing Material)

The sealing material is interposed between the substrates 17 and 18 and disposed in a state of surrounding the liquid crystal layer to seal the liquid crystal layer. The sealing material has a function of sticking the substrates 17 and 18 together. The sealing material is frame-shaped such that it encloses the liquid crystal layer when the liquid crystal cell is seen in plan view.

The sealing material includes a cured product of a curable resin composition containing a curable resin. The curable resin is not particularly limited as long as it has an ultraviolet ray-reactive functional group and a thermally reactive functional group, and a resin having (meth)acryloyl group and/or an epoxy group is preferably used, because a curing reaction is rapidly advanced when the curable resin composition is used as a sealing agent for a liquid crystal-dropping method, and the adhesive property is good. Such a curable resin may include, for example, (meth)acrylate and an epoxy resin. The resin may be used alone or as a mixture of two or more kinds. In the present specification, the term (meth)acrylic refers to acrylic and methacrylic.

The (meth)acrylate is not particularly limited, and may include, for example, urethane (meth)acrylate having a urethane bond, and epoxy (meth)acrylate derived from a compound having a glycidyl group and (meth)acrylic acid.

The urethane (meth)acrylate is not particularly limited, and may include, for example, derivatives of diisocyanate such as isophorone diisocyanate and a reactive compound which causes an addition-reaction with isocyanate such as acrylic acid or hydroxyethyl acrylate. The derivatives may be subjected to a chain extension using caprolactone, polyol, or the like. Commercially available products thereof may include, for example, U-122P, U-340P, U-4HA, and U-1084A (which are manufactured by Shin-Nakamura Chemical Co., Ltd.); and KRM 7595, KRM 7610, and KRM 7619 (which are manufactured by Daicel UCB Co., Ltd.).

The epoxy (meth)acrylate is not particularly limited, and may include, for example, epoxy (meth)acrylates derived from an epoxy resin such as a bisphenol-A epoxy resin or propyleneglycol diglycidyl ether and (meth)acrylic acid. Commercially available products thereof may include, for example, EA-1020, EA-6320, and EA-5520 (which are manufactured by Shin-Nakamura Chemical Co., Ltd.); and Epoxy Ester 70PA and Epoxy Ester 3002A (which are manufactured by Kyoeisha Chemical Co., Ltd.).

The other (meth)acrylate may include, for example, methyl methacrylate, tetrahydrofurfuryl methacrylate, benzyl methacrylate, isobornyl methacrylate, 2-hydroxyethyl methacrylate, glycidyl methacrylate, (poly)ethylene glycol dimethacrylate, 1,4-butandiol dimethacrylate, 1,6-hexanediol dimethacrylate, trimethylolpropane triacrylate, pentaerythritol triacrylate, and glycerin dimethacrylate.

The epoxy resin may include, for example, a phenol novolac epoxy resin, a cresol novolac epoxy resin, a biphenyl novolac epoxy resin, a trisphenol novolac epoxy resin, a dicyclopentadiene novolac epoxy resin, a bisphenol-A epoxy resin, a bisphenol-F epoxy resin, a 2,2'-diallylbisphenol-A epoxy resin, a bisphenol-S epoxy resin, a hydrogenated bisphenol-A epoxy resin, a propyleneoxide-added bisphenol-A epoxy resin, a biphenyl epoxy resin, a naphthalene epoxy resin, resorcinol epoxy resin, and glycidyl amines.

The commercially available epoxy resin may include, for example, NC-3000S (manufactured by Nippon Kayaku Co., Ltd.) as the phenyl novolac epoxy resin; EPPN-501H and EPPN-501H (which are manufactured by Nippon Kayaku Co., Ltd.) as the trisphenol novolac epoxy resin; NC-7000L (manufactured by Nippon Kayaku Co., Ltd.) as the dicyclopentadiene novolac epoxy resin; EPICLON 840S and EPICLON 850CRP (which are manufactured by DIC Corporation) as the bisphenol-A epoxy resin; EPIKOTE 807 (manufactured by Japan Epoxy Resins Co., Ltd.), and EPICLON 830 (manufactured by DIC Corporation) as the bisphenol-F epoxy resin; RE 310 NM (manufactured by Nippon Kayaku Co., Ltd.) as the 2,2'-diallylbisphenol-A epoxy resin; EPICLON 7015 (manufactured by DIC Corporation) as the hydrogenated bisphenol epoxy resin; Epoxy Ester 3002A (manufactured by Kyoeisha Chemical Co., Ltd.) as the propylene oxide-added bisphenol-A epoxy resin; EPIKOTE YX-4000H and YL-6121H (which are manufactured by Japan Epoxy Resins Co., Ltd.) as the biphenyl epoxy resin; EPICLON HP-4032 (manufactured by DIC Corporation) as the naphthalene epoxy resin; DENACOL EX-201 (manufactured by Nagase ChemteX Corporation) as the resorcinol epoxy resin; and EPICLON 430 (manufactured by DIC Corporation) and EPIKOTE 630 (manufactured by Japan Epoxy Resins Co., Ltd.) as the glycidyl amines.

An epoxy/(meth)acrylic resin having at least one each of a (meth)acrylic group and an epoxy group in one molecule can be preferably used as the curable resin in the curable resin composition. The epoxy/(meth)acrylic resin may include, for example, a compound obtained by reacting a part of the epoxy groups in the epoxy resin with (meth)acrylic acid in the presence of a basic catalyst according to a usual method; a compound obtained by reacting one mole of a di- or more-functional isocyanate with ½ mole of a (meth)acrylic monomer having a hydroxyl group, followed by ½ mole of glycidol; and a compound obtained by reacting (meth)acrylate having an isocyanato group with glycidol. The commercially available product of the epoxy/(meth)acrylic resin may include, for example, UVAC 1561 (manufactured by Daicel UCB Co., Ltd.).

The curable resin composition includes a photo-polymerization initiator. The photo-polymerization initiator is not particularly limited as long as it polymerizes the curable resin by irradiation of ultraviolet light. The photo-polymerization initiator may include, for example, compounds represented by the chemical formula (15-1) and the chemical formula (15-2).

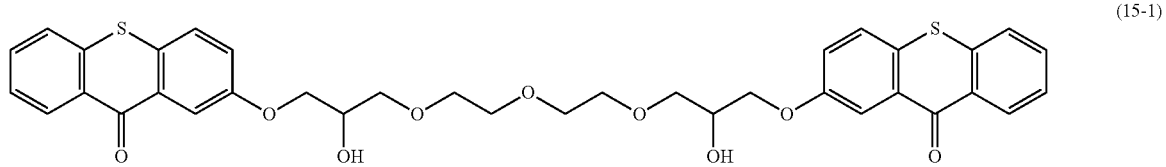

(15-1)

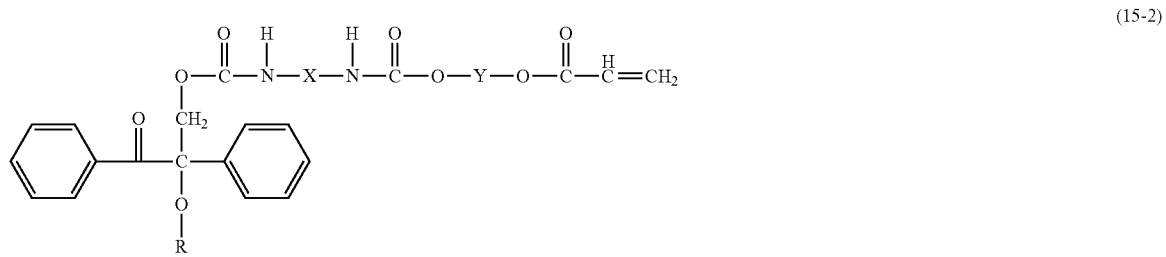

(15-2)

In the formula (15-2), R is hydrogen or an aliphatic hydrocarbon residue having 4 or less carbon atoms; X is a residue of a difunctional isocyanate derivative having 13 or less carbon atoms; and Y is an aliphatic hydrocarbon residue having 4 or less carbon atoms or a residue in which a ratio of the number of carbon atoms to the number of oxygen atoms is 3 or less. When X is a residue of a difunctional isocyanate derivative having more than 13 carbon atoms, it may be easily dissolved in the liquid crystal, and when Y is an aliphatic hydrocarbon group having more than 4 carbon atoms or a residue in which a ratio of the number of carbon atoms to the number of oxygen atoms is more than 3, it may be easily dissolved in the liquid crystal.

The commercially available photo-polymerization initiator may include, for example, "Irgacure 651", "Irgacure 189" and "Irgacure OXE01" (which are manufactured by BASF Japan Ltd.).

The curable resin composition contains a thermal curing agent. The thermal curing agent is an agent for reacting and cross-linking a thermally reactive functional group in the curable resin by heating, and has a role to improve the adhesive property and the moisture resistance of the cured curable resin composition. The thermal curing agent is not particularly limited, and compounds having an amine and/or thiol group, which have an excellent low temperature reactivity, are preferable, because they are cured at a curing temperature of 100 to 120° C. when the curable resin composition of the present invention is used as a sealing agent for a dropping method. Such a thermal curing agent is not particularly limited, and may include, for example, hydrazide compounds such as 1,3-bis[hydrazinocarbonoethyl-5-isopropylhydantoin] and adipic acid dihydrazide; dicyandiamide, guanidine derivatives, 1-cyanoethyl-2-phenylimidazole, N-[2-(2-methyl-1-imidazolyl)ethyl]urea, 2,4-diamino-6-[2'-methylimidazolyl-(1')]-ethyl-s-triazine, N,N'-bis(2-methyl-1-imidazolylethyl)urea, N,N'-(2-methyl-1-imidazolylethyl)-adipamide, 2-phenyl-4-methyl-5-hydroxymethyl imidazole, 2-imidazolin-2-thiol, 2-2'-thiodiethane thiol, and an addition product of various amines with an epoxy resin. They may be used alone or as a mixture of two or more kinds.

The line width of the sealing material is not particularly limited, and the sealing material may include, for example, a part having a line width of 1.0 mm or less.

(Liquid Crystal Layer)

The liquid crystal layer 19 is formed from the liquid crystal material, which is a composition containing a liquid crystal compound (liquid crystal molecule). The liquid crystal material includes a liquid crystal compound having a polarity (polar liquid crystal compound), having a structure represented by any of the following chemical formula (1-1) and chemical formula (1-2).

   (1-1)

   (1-2)

In the chemical formula (1-1) and the chemical formula (1-2), $A_1$ is a phenyl group, a phenylene group, a naphthyl group, a naphthylene group, a cyclohexyl group, or a cyclohexylene group; $A_2$ is a phenyl group, a phenylene group, a naphthyl group, or a naphthylene group (provided that the hydrogen atom in the functional groups $A_1$ and $A_2$ may be substituted by a fluoro group, a chloro group, a bromo group, a methyl group, or an ethyl group); $X_1$ is an oxygen atom or a direct bond; and n is an integer of 1 to 6.

The liquid crystal compound has preferably a structure represented by any of the following chemical formula (7-1) to chemical formula (7-3):

   (7-1)

   (7-2)

   (7-3)

In the chemical formula (7-1) to the chemical formula (7-3), the hydrogen atom in the phenyl group or the hydrogen atom in the cyclohexyl group may be substituted by a fluoro group, a chloro group, a bromo group, a methyl group, or an ethyl group; and n is an integer of 1 to 6.

Specific examples of the liquid crystal compound may include compounds represented by the following chemical formula (18-1) to chemical formula (18-12), and the following chemical formula (19-1) to chemical formula (19-13):

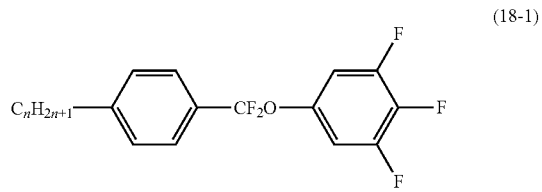   (18-1)

   (18-2)

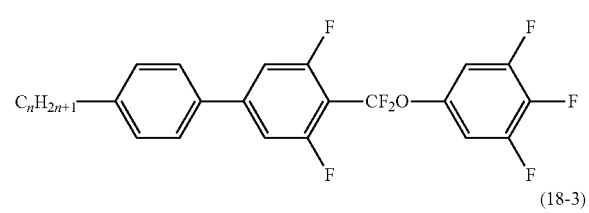   (18-3)

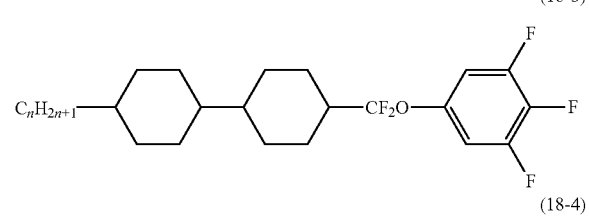   (18-4)

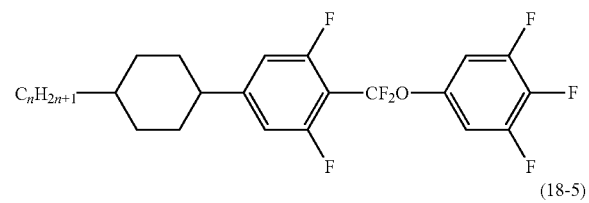   (18-5)

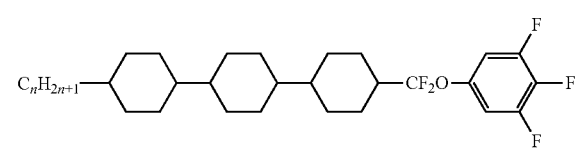

(18-6)
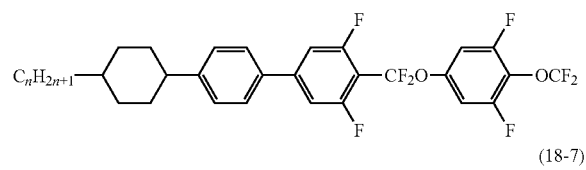
(18-7)
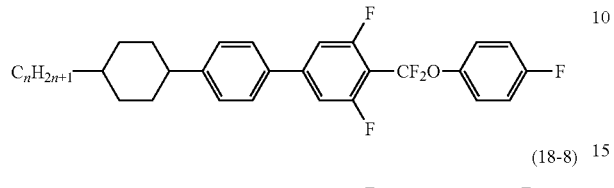
(18-8)
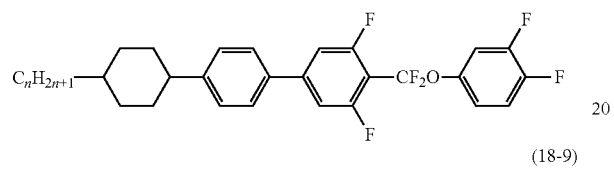
(18-9)
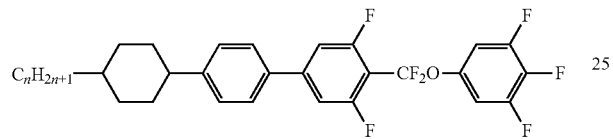
(18-10)
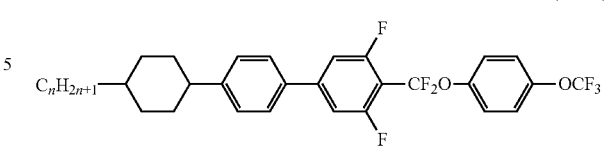
(18-11)
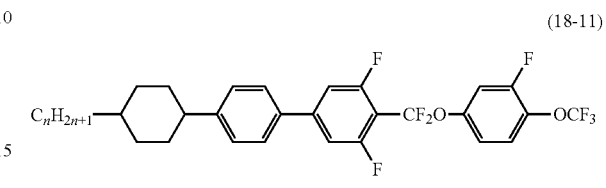
(18-12)
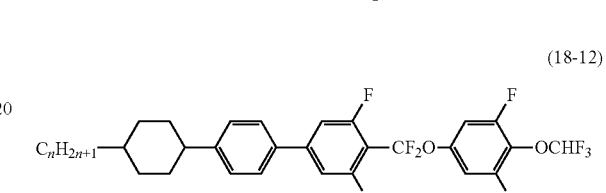
In the chemical formula (18-1) to the chemical formula (18-12), n is an integer of 0 to 15.
(19-1)
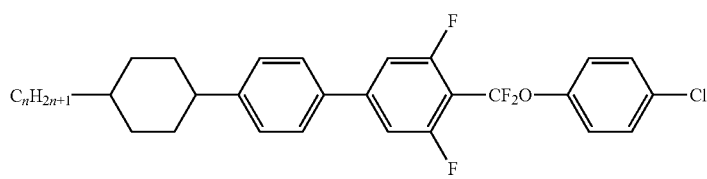
(19-2)
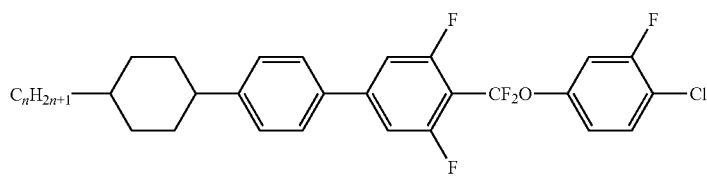
(19-3)
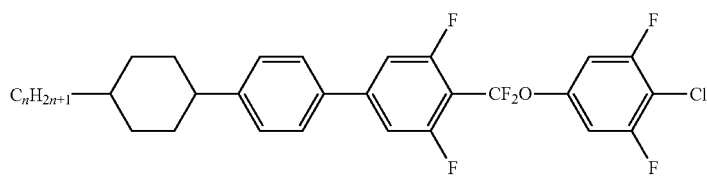
(19-4)
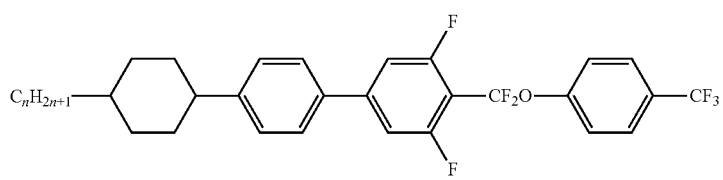
(19-5)
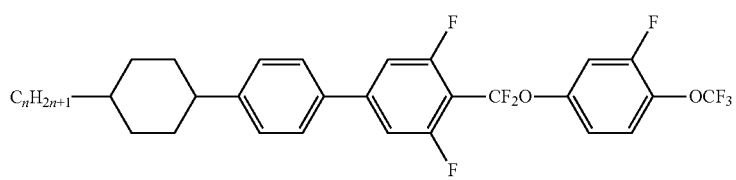

-continued
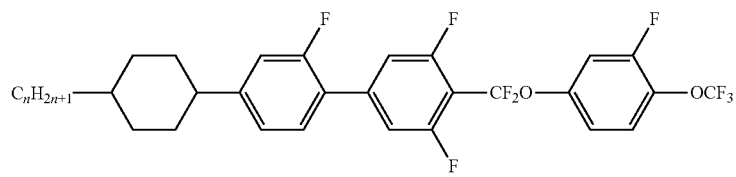 (19-6)
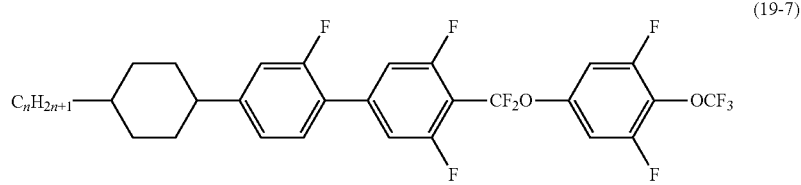 (19-7)
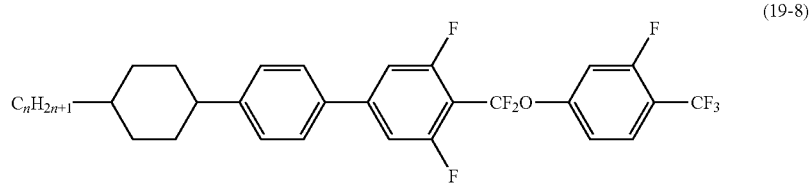 (19-8)
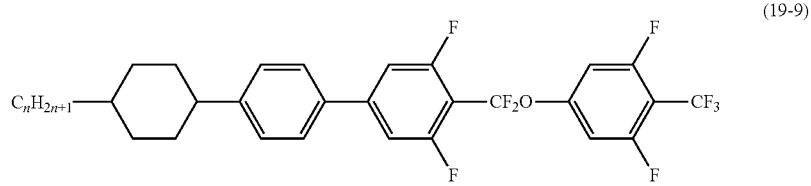 (19-9)
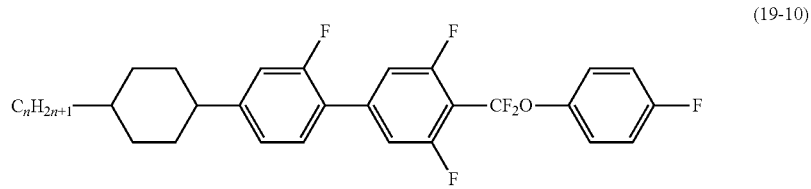 (19-10)
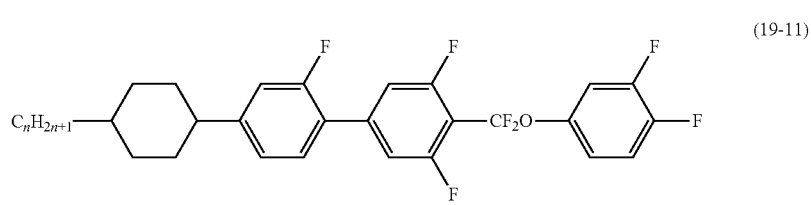 (19-11)
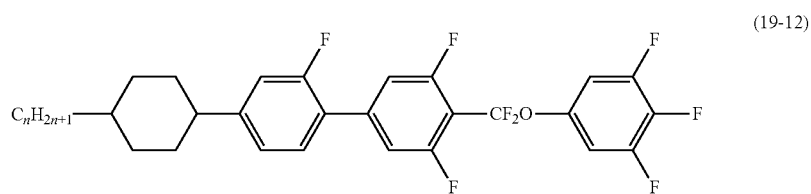 (19-12)
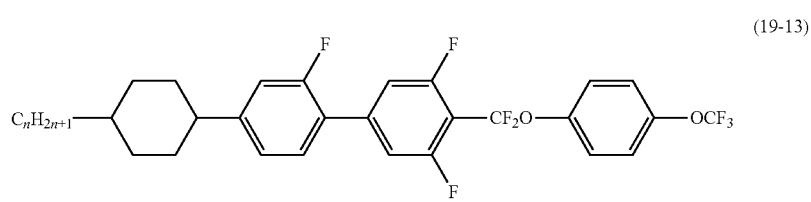 (19-13)

In the chemical formula (19-1) to the chemical formula (19-13), n is an integer of 0 to 15.

Among the liquid crystal compounds represented by the chemical formula (18-1) to the chemical formula (18-12) and the chemical formula (19-1) to the chemical formula (19-13), the liquid crystal compound represented by the chemical formula (18-9) is preferable.

In the liquid crystal material, the content of the liquid crystal compound (polar liquid crystal compound) is not particularly limited as long as the objects of the present invention are not impaired, and it is preferably, for example, 3 to 20% by mass.

The liquid crystal compound forming the liquid crystal material has preferably a nematic-isotropic phase transition temperature (Tni) of 90° C. or higher and 110° C. or lower. Tni of the liquid crystal material can be obtained, for example, by analyzing a thermal behavior of the liquid crystal material utilizing differential scanning calorimetry (DSC).

The liquid crystal compound used for the liquid crystal material, other than the polar liquid crystal compound, may include, for example, compounds represented by the following chemical formula (20-1) to chemical formula (20-4).

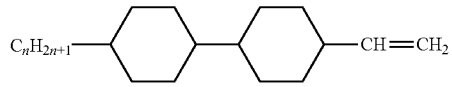
(20-1)

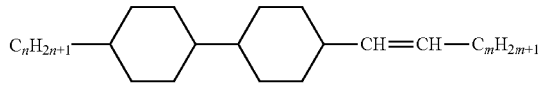
(20-2)

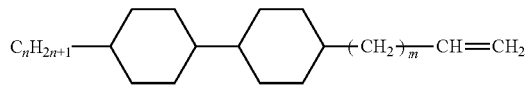
(20-3)

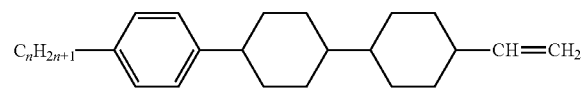
(20-4)

In the chemical formula (20-1) to the chemical formula (20-4), m and n are the same or different, and preferably each an integer of 1 to 6.

The specific liquid crystal compound represented by the chemical formula (20-1) may include, for example, a compound represented by the following chemical formula (21):

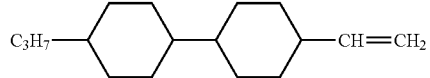
(21)

It is preferable that the liquid crystal compound used for the liquid crystal material does not contain a structure (ether structure) represented by the following chemical formula (9). The liquid crystal compound containing no structure represented by the chemical formula (9) is prevented from decomposition (hydrolysis) by water intruding into the liquid crystal layer.

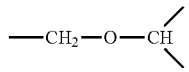
(9)

EXAMPLES

The present invention is described in more detail below, referring to Examples. The present invention is not limited to Examples at all.

Example 1

An array substrate for an FFS mode in which a TFT and a pixel electrode were formed on a glass substrate, and a counter substrate for an FFS mode (having no electrode) in which a CF and the like were formed on a glass substrate were prepared. Substrate surfaces of the array substrate and the counter substrate were coated with an alignment agent containing a polyimide polymer (the degree of imidization: 50%) having a cyclobutane ring represented by the chemical formula (2) by the spin coating method. The resulting coated products were subjected to a pre-baking treatment in which they were heated at 80° C. for 2 minutes, followed by a first baking treatment in which they were heated at 200° C. for 20 minutes. After that, the coated products were subjected to a photo-alignment treatment in which linearly polarized light (containing deep ultraviolet light having a wavelength of 240 nm to 270 nm) was emitted to the coated products under a condition of 500 mJ/cm² from a predetermined direction. After that, the coated products were subjected to a second baking treatment in which they were heated at 200° C. for 20 minutes. As described above, the photo-alignment films (horizontal photo-alignment films) were formed on both substrate surfaces of the array substrate and the counter substrate.

In the chemical formula (2) described above, p is any natural number. In the chemical formula (2), X includes a structure having a cyclobutane ring represented by the following chemical formula (3-1), and in the chemical formula (2), Y has a structure represented by the following chemical formula (3-2).

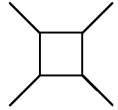
(3-1)

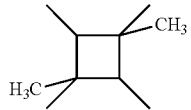
(3-2)

Subsequently, an uncured sealing material for ODF (one drop fill) (trademark "Photrek", manufactured by Sekisui Chemical Co., Ltd.) was drawn in the shape of a frame onto the photo-alignment film on the array substrate utilizing a dispenser. The uncured sealing material had ultraviolet curability and thermosetting property, and included a mixed composition containing a photo-polymerization initiator and a (meth)acrylic monomer, utilized in photo-polymerization (radical polymerization) and an epoxy monomer represented by the following chemical formula (25) and an amine curing agent, utilized in thermal polymerization.

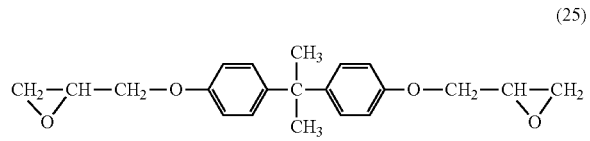 [SMILES: CC(C)(c1ccc(OCC2CO2)cc1)c1ccc(OCC2CO2)cc1]
(25)

Next, a liquid crystal material with a nematic-isotropic phase transition temperature (Tni) of 90° C. was added dropwise to a predetermined part on the photo-alignment film on the counter substrate. The liquid crystal material contained a polar liquid crystal compound having a structure represented by the chemical formula (26), (specifically, a compound represented by the chemical formula (27)) in a content of 3% by mass. In the chemical formula (27), n is an integer of 1 to 6. The liquid crystal material included, for example, a compound represented by the chemical formula (21), in addition to the compound represented by the chemical formula (27).

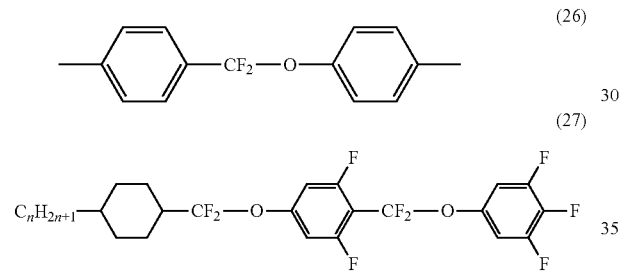
(26)

(27)

Subsequently, the array substrate and the counter substrate were stuck together in vacuo to obtain a laminate, and ultraviolet light (including ultraviolet light with a wavelength of 300 nm to 400 nm) was emitted to the sealing material in the laminate to photo-cure the sealing material. The resulting laminate was heated at 130° C. for 40 minutes, whereby the sealing material was thermally cured to seal the liquid crystal material as well as a realignment treatment in which the liquid crystal material was converted to an isotropic phase was performed. After that, the laminate was cooled to room temperature to obtain an FFS mode liquid crystal cell of Example 1. The narrowest part of the sealing material had a width of 1.0 mm or less.

Examples 2 and 3 and Comparative Example 1

Liquid crystal materials of Examples 2 and 3 and Comparative Example 1 were prepared in the same manner as in Example 1 except that the content of the compound represented by the chemical formula (27) was changed to values shown in Table 1. FFS mode liquid crystal cells of Examples 2 and 3 and Comparative Example 1 were fabricated in the same manner as in Example 1 except that the liquid crystal materials of Examples 2 and 3 and Comparative Example 1 were used instead of the liquid crystal material of Example 1.

Comparative Example 2

A liquid crystal material of Comparative Example 2 was prepared in which a compound having a structure represented by the following chemical formula (28) (specifically, a compound represented by the following chemical formula (29)) was contained in a content of 10% by mass instead of the compound represented by the chemical formula (27). An FFS mode liquid crystal cell of Comparative Example 2 was fabricated in the same manner as in Example 1 except that the liquid crystal material of Comparative Example 2 was used instead of the liquid crystal material of Example 1.

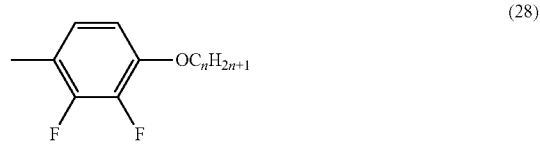
(28)

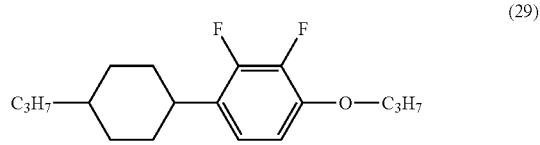
(29)

(Electric Field Response)

In the liquid crystal cells of Example 1 and the like, a voltage of 7 V was applied to between electrodes, and whether or not the liquid crystal material responded thereto was visually observed. The results are shown in Table 1.

(High Temperature and High Humidity Test)

The liquid crystal cells of Example 1 and the like were subjected to a high temperature and high humidity test described below. The liquid crystal cell was set on a back light turned on and was left as it was for 1000 hours in a thermostatic and humidifying chamber having a temperature of 60° C. and humidity of 95% RH, and voltage holding ratios (VHR) of the liquid crystal cell were measured before and after the leaving (at the time of beginning of the test and 1000 hours after the beginning of the test). The voltage holding ratio was measured using a 6254 type VHR system (manufactured by TOYO Corporation) under conditions of a voltage of 1 V and a temperature of 70° C. The results are shown in Table 1.

(Observation of Generation of Bright Spot)

The liquid crystal cells of Example 1 and the like were interposed between a pair of cross-nicol polarizing plates, and whether or not fine bright spots were generated on a display part of the liquid crystal cell was visually observed. The results are shown in Table 1.

TABLE 1

| | LIQUID CRYSTAL MATERIAL (COMPOSITION) | | 0 HOUR | | | AFTER 1000 HOURS | |
|---|---|---|---|---|---|---|---|
| | Tni (° C.) | LIQUID CRYSTAL COMPOUND (wt %) | ELECTRIC FIELD RESPONSE | VHR (%) | FINE BRIGHT SPOT | VHR (%) | FINE BRIGHT SPOT |
| EXAMPLE 1 | 90 | CHEMICAL FORMULA (27) 3 wt % | YES | 99.5 | NONE | 98.9 | NONE |
| EXAMPLE 2 | 90 | CHEMICAL FORMULA (27) 5 wt % | YES | 99.5 | NONE | 99.1 | NONE |
| EXAMPLE 3 | 90 | CHEMICAL FORMULA (27) 10 wt % | YES | 99.5 | NONE | 99.1 | NONE |
| COMPARATIVE EXAMPLE 1 | 90 | CHEMICAL FORMULA (27) 0 wt % | NO | 99.5 | NONE | 98.9 | NONE |
| COMPARATIVE EXAMPLE 2 | 90 | CHEMICAL FORMULA (29) 10 wt % | YES | 99.5 | NONE | 91.2 | GENERATED |

The liquid crystal cells of Examples 1 to 3 contained the polar liquid crystal compound represented by the chemical formula (27) in the liquid crystal material in a content of 3 to 10% by mass, and thus they showed the electric field response and the small lowering of the VHR after 1000 hours, and fine bright spots were not generated. It is supposed that the lowering of the VHR after 1000 hours was caused by influence of the intrusion of the outside moisture into the liquid crystal layer.

On the other hand, the liquid crystal cell of Comparative Example 1 did not contain the polar liquid crystal compound represented by the chemical formula (27) in the liquid crystal material, and thus it did not show the electric field response.

The liquid crystal cell of Comparative Example 2 was a cell in which the liquid crystal compound represented by the chemical formula (29) was contained in the liquid crystal material in a content of 10% by mass, and thus it showed the electric field response. However, the lowering of the VHR after 1000 hours was large and the fine bright spots were observed. The causes can be supposed as follows: the narrowest part of the sealing material had a width of 1.0 mm or less, and thus the moisture outside the liquid crystal cell moved in the sealing material and intruded into the liquid crystal layer, and the liquid crystal compound represented by the chemical formula (29) contained in the liquid crystal layer was decomposed into a compound containing a hydroxyl group (methylol group) by the influence of the moisture. It can also be considered that the decomposition by the moisture as described above is influenced by the polyamic acid, existing in the photo-alignment film brought into contact with the liquid crystal layer. Meanwhile, decomposition products of the photo-alignment film (an imide component, and the like), produced after the photo-alignment treatment, were eluted in the liquid crystal layer, and the eluted decomposition products formed a hydrogen bond with the compound having a hydroxyl group (methylol group) (the decomposition product of the liquid crystal compound). As a result, the decomposition products of the photo-alignment film existed stably in the liquid crystal layer, and fine bright spots were generated thereby in the display part of the liquid crystal cell.

Example 4

An array substrate for an IPS mode in which a TFT, a pixel electrode and the like were formed on a glass substrate, and a counter substrate for an IPS mode (having no electrode) in which a CF and the like were formed on a glass substrate were prepared. Substrate surfaces of the array substrate and the counter substrate were coated with the same alignment agent as used in Example 1 by the spin coating method. The resulting coated products were subjected to a pre-baking treatment in which they were heated at 80° C. for 2 minutes, followed by a photo-alignment treatment in which linearly polarized light (containing deep ultraviolet light having a wavelength of 240 nm to 270 nm) was emitted to the coated products under a condition of 500 mJ/cm$^2$ from a predetermined direction. After that, the coated products, which had been subjected to the photo-alignment treatment, was subjected to a baking treatment in which they were heated at 220° C. for 40 minutes. As described above, the photo-alignment films (horizontal photo-alignment films), which had been subjected to the realignment treatment (the conformation of the polymer was adjusted), were formed on both substrate surfaces of the array substrate and the counter substrate.

Subsequently, the uncured sealing material for ODF was drawn in the shape of a frame onto the photo-alignment film on the array substrate utilizing a dispenser in the same manner as in Example 1.

Next, a liquid crystal material with a nematic-isotropic phase transition temperature (Tni) of 100° C. was added dropwise to a predetermined part on the photo-alignment film on the counter substrate. The liquid crystal material contained a polar liquid crystal compound having a structure represented by the chemical formula (30) (specifically, a compound represented by the chemical formula (31)) in a content of 3% by mass. The liquid crystal material included the compound represented by the chemical formula (21), in addition to the compound represented by the chemical formula (31), as in Example 1.

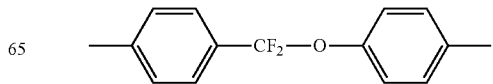

(30)

-continued

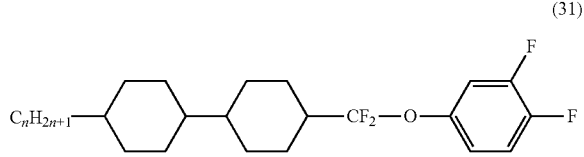
(31)

Subsequently, the array substrate and the counter substrate were stuck together in vacuo to obtain a laminate, and ultraviolet light (including ultraviolet light with a wavelength of 300 nm to 400 nm) was emitted to the sealing material in the laminate to photo-cure the sealing material. The resulting laminate was heated at 130° C. for 40 minutes, whereby the sealing material was thermally cured to seal the liquid crystal material as well as a realignment treatment in which the liquid crystal material was converted to an isotropic phase was performed. After that, the laminate was cooled to room temperature to obtain an IPS mode liquid crystal cell of Example 4. The narrowest part of the sealing material had a width of 1.0 mm or less.

Examples 5 and 6 and Comparative Example 3

Liquid crystal materials of Examples 5 and 6 and Comparative Example 3 were prepared in the same manner as in Example 4 except that the content of the compound represented by the chemical formula (31) was changed to values shown in Table 2. IPS mode liquid crystal cells of Examples 5 and 6 and Comparative Example 3 were fabricated in the same manner as in Example 4 except that the liquid crystal materials of Examples 5 and 6 and Comparative Example 3 were used instead of the liquid crystal material of Example 4.

Comparative Example 4

A liquid crystal material (Tni=100° C.) of Comparative Example 4 was prepared in which a compound having a structure represented by the chemical formula (28) (specifically, a compound represented by the chemical formula (29)) was contained in a content of 10% by mass instead of the compound represented by the chemical formula (31). An IPS mode liquid crystal cell of Comparative Example 4 was fabricated in the same manner as in Example 4 except that the liquid crystal material of Comparative Example 4 was used instead of the liquid crystal material of Example 4.

(Electric Field Response, High Temperature and High Humidity Test, and Observation of Generation of Bright Spot)

The observation of the electric field response, the high temperature and high humidity test, and the observation of generation of bright spots of the liquid crystal cells of Example 4 and the like were performed in the same manner as in Example 1. The results are shown in Table 2.

TABLE 2

| | LIQUID CRYSTAL MATERIAL (COMPOSITION) | | 0 HOUR | | | AFTER 1000 HOURS | |
|---|---|---|---|---|---|---|---|
| | Tni (° C.) | LIQUID CRYSTAL COMPOUND (wt %) | ELECTRIC FIELD RESPONSE | VHR (%) | FINE BRIGHT SPOT | VHR (%) | FINE BRIGHT SPOT |
| EXAMPLE 4 | 100 | CHEMICAL FORMULA (31) 3 wt % | YES | 99.5 | NONE | 99.0 | NONE |
| EXAMPLE 5 | 100 | CHEMICAL FORMULA (31) 5 wt % | YES | 99.5 | NONE | 99.1 | NONE |
| EXAMPLE 6 | 100 | CHEMICAL FORMULA (31) 10 wt % | YES | 99.5 | NONE | 99.2 | NONE |
| COMPARATIVE EXAMPLE 3 | 100 | CHEMICAL FORMULA (31) 0 wt % | NO | 99.5 | NONE | 99.0 | NONE |
| COMPARATIVE EXAMPLE 4 | 100 | CHEMICAL FORMULA (29) 10 wt % | YES | 99.5 | NONE | 92.7 | GENERATED |

The liquid crystal cells of Examples 4 to 6 contained the liquid crystal compound represented by the chemical formula (31) having the polarity in the liquid crystal material in a content of 3 to 10% by mass, and thus they showed the electric field response and the small lowering of the VHR after 1000 hours, and fine bright spots were not generated. It is supposed that the lowering of the VHR after 1000 hours was caused by influence of the intrusion of the outside moisture into the liquid crystal layer.

On the other hand, the liquid crystal cell of Comparative Example 3 did not contain the liquid crystal compound represented by the chemical formula (31) in the liquid crystal material, and thus it did not show the electric field response.

The liquid crystal cell of Comparative Example 4 was a cell in which the liquid crystal compound represented by the chemical formula (29) was contained in the liquid crystal material in a content of 10% by mass, and thus it showed the electric field response. However, the lowering of the VHR after 1000 hours was large and the fine bright spots were observed. It is supposed that the causes are the same as in Comparative Example 2.

Example 4 and the like were the cases where the photo-alignment treatment was performed before the baking treatment in the production process of the liquid crystal cell, unlike Example 1. In such cases, the same tendency of the test results as obtained in Example 1 and the like (i.e., the case where the photo-alignment treatment was performed after the baking treatment) was obtained.

Example 7

An agent obtained in the following manner was used as an alignment agent of Example 7. The agent was obtained by adding an acrylamide polymer represented by the following chemical formula (6-1) (one example of the (meth)acrylamide polymer) to a solution including a polyimide polymer having a cyclobutane ring (the degree of imidization: 50%), represented by the chemical formula (2), which was the same as used in Example 1, in a content of 5% by mass relative to 100% by mass of the total of the polyimide polymer and the acrylamide polymer, and leaving the solution at room temperature in a dark place overnight to completely dissolve the acrylamide polymer.

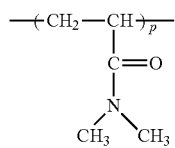

(6-1)

The same array substrate and counter substrate for the FFS mode as used in Example 1 were prepared. Both substrate surfaces of the array substrate and the counter substrate were coated with the alignment agent of Example 7 according to the spin coating method. The coated products were subjected to a pre-baking treatment in which they were heated at 80° C. for 2 minutes, followed by a photo-alignment treatment in which linearly polarized light (containing deep ultraviolet light having a wavelength of 240 nm to 270 nm) was emitted to the coated products from a predetermined direction under a condition of 500 mJ/cm². After that, the coated products, which had been subjected to the photo-alignment treatment, was subjected to a baking treatment in which they were heated at 220° C. for 40 minutes. As described above, the photo-alignment films (horizontal photo-alignment films) were formed on the substrate surfaces of the array substrate and the counter substrate.

Subsequently, an uncured sealing material for ODF, which was similar to that used in Example 1, was drawn in the shape of a frame onto the photo-alignment film on the array substrate utilizing a dispenser. Next, a liquid crystal material with a nematic-isotropic phase transition temperature (Tni) of 100° C. was added dropwise to a predetermined part on the photo-alignment film on the counter substrate. The liquid crystal material contained a polar liquid crystal compound having a structure represented by the chemical formula (26) (specifically, a compound represented by the chemical formula (27)) in a content of 3% by mass. The liquid crystal material included the compound represented by the chemical formula (21), in addition to the compound represented by the chemical formula (27), as in Example 1.

Subsequently, the array substrate and the counter substrate were stuck together in vacuo to obtain a laminate, and ultraviolet light (including ultraviolet light with a wavelength of 300 nm to 400 nm) was emitted to the sealing material in the laminate to photo-cure the sealing material. The resulting laminate was heated at 130° C. for 40 minutes, whereby the sealing material was thermally cured to seal the liquid crystal material as well as a realignment treatment in which the liquid crystal material was converted to an isotropic phase was performed. After that, the laminate was cooled to room temperature to obtain an FFS mode liquid crystal cell of Example 7. The narrowest part of the sealing material had a width of 1.0 mm or less.

Examples 8 to 10 and Comparative Example 5

Alignment agents of Examples 8 to 10 and Comparative Example 5 were prepared in the same manner as in Example 7 except that the content of the acrylamide polymer represented by the chemical formula (6-1) was changed to values shown in Table 3. FFS mode liquid crystal cells of Examples 8 to 10 and Comparative Example 5 were fabricated in the same manner as in Example 7 except that the alignment agents of Examples 8 to 10 and Comparative Example 5 were used instead of the alignment agent of Example 7.

Examples 11 to 13 and Comparative Example 6

Alignment agents of Examples 11 to 13 and Comparative Example 6 were prepared in the same manner as in Example 7 except that the acrylamide polymer represented by the following chemical formula (6-2), instead of the acrylamide polymer represented by the chemical formula (6-1), was used in a content shown in Table 3. FFS mode liquid crystal cells of Examples 11 to 13 and Comparative Example 6 were fabricated in the same manner as in Example 7 except that the alignment agents of Examples 11 to 13 and Comparative Example 6 were used instead of the alignment agent of Example 7.

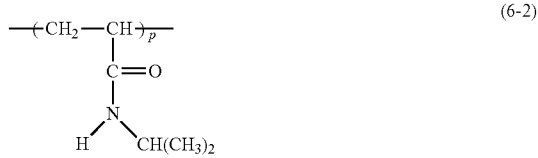

(6-2)

(Electric Field Response, High Temperature and High Humidity Test, and Observation of Generation of Bright Spot)

The observation of the electric field response, the high temperature and high humidity test, and the observation of generation of bright spots of the liquid crystal cells of Example 8 and the like were performed in the same manner as in Example 1. The results are shown in Table 3.

TABLE 3

| | | LIQUID CRYSTAL MATERIAL (COMPOSITION) | | 0 HOUR | | | AFTER 1000 HOURS | |
|---|---|---|---|---|---|---|---|---|
| | Tni (° C.) | LIQUID CRYSTAL COMPOUND (wt %) | ACRYLAMIDE POLYMER (wt %) | ELECTRIC FIELD RESPONSE | VHR (%) | FINE BRIGHT SPOT | VHR (%) | FINE BRIGHT SPOT |
| EXAMPLE 10 | 100 | CHEMICAL FORMULA (27) 3 wt % | CHEMICAL FORMULA (6-1) 0 wt % | YES | 99.5 | NONE | 98.9 | NONE |
| EXAMPLE 7 | 100 | CHEMICAL FORMULA (27) 3 wt % | CHEMICAL FORMULA (6-1) 5 wt % | YES | 99.5 | NONE | 99.2 | NONE |
| EXAMPLE 8 | 100 | CHEMICAL FORMULA (27) 3 wt % | CHEMICAL FORMULA (6-1) 10 wt % | YES | 99.5 | NONE | 99.5 | NONE |
| EXAMPLE 9 | 100 | CHEMICAL FORMULA (27) 3 wt % | CHEMICAL FORMULA (6-1) 20 wt % | YES | 99.5 | NONE | 99.5 | NONE |
| COMPARATIVE EXAMPLE 5 | 100 | CHEMICAL FORMULA (27) 3 wt % | CHEMICAL FORMULA (6-1) 30 wt % | NOT OBSERVED | 99.5 | NONE | 99.5 | NONE |
| EXAMPLE 11 | 100 | CHEMICAL FORMULA (27) 3 wt % | CHEMICAL FORMULA (6-2) 5 wt % | YES | 99.5 | NONE | 99.0 | NONE |
| EXAMPLE 12 | 100 | CHEMICAL FORMULA (27) 3 wt % | CHEMICAL FORMULA (6-2) 10 wt % | YES | 99.5 | NONE | 99.4 | NONE |
| EXAMPLE 13 | 100 | CHEMICAL FORMULA (27) 3 wt % | CHEMICAL FORMULA (6-2) 20 wt % | YES | 99.5 | NONE | 99.4 | NONE |
| COMPARATIVE EXAMPLE 6 | 100 | CHEMICAL FORMULA (27) 3 wt % | CHEMICAL FORMULA (6-2) 30 wt % | NOT OBSERVED | 99.5 | NONE | 99.5 | NONE |

The liquid crystal cells of Examples 7 to 9 had the photo-alignment film into which the acrylamide polymer represented by the chemical formula (6-1) was introduced. In addition, the liquid crystal cells of Examples 11 to 13 had the photo-alignment film into which the acrylamide polymer represented by the chemical formula (6-2) was introduced. When the acrylamide polymer was introduced into the photo-alignment film, as described above, the lowering of the VHR after 1000 hours was smaller than that in Example 10 in which the acrylamide polymer was not introduced, and fine bright spots were not generated. The cause of such a result can be supposed as follows: In the photo-alignment treatment performed when the photo-alignment film was formed, low molecular weight decomposition products (an imide component, and the like), formed by decomposition of the cyclobutane ring in the polyimide polymer, drew hydrogen atoms from the polyimide polymer in the photo-alignment film. Then, radicals were generated in the low molecular weight decomposition products, and the low molecular weight decomposition products with the radicals were bonded to each other through cross-linking, whereby a polymer of the low molecular weight decomposition products whose molecular weight was increased was obtained. The low molecular weight decomposition products were bonded to (polymerized with) each other and turned into a polymer having a relatively large molecular weight, whereby the elution thereof into the liquid crystal layer from the photo-alignment film was suppressed. As described above, the lowering of the VHR after 1000 hours was suppressed, and the generation of the fine bright spots was also suppressed.

When the acrylamide polymer represented by the chemical formula (6-1) or the chemical formula (6-2) was introduced in a content of 30% by mass relative to 100% by mass of the total of the polyimide polymer and the acrylamide polymer, as the liquid crystal cells of Comparative Example 5 and Comparative Example 6, the finally obtained photo-alignment films became clouded, and the electric field response could not be observed.

Examples 14 to 17 and Comparative Examples 7 and 8

Liquid crystal materials of Examples 14 to 17 and Comparative Examples 7 and 8 were prepared in the same manner as in Example 1 except that the content of the polar liquid crystal compound represented by the chemical formula (27) was changed to 5% by mass, and Tni (° C.) was adjusted to values shown in Table 4. FFS mode liquid crystal cells of Examples 14 to 17 and Comparative Examples 7 and 8 were fabricated in the same manner as in Example 1 except that the liquid crystal materials of Examples 14 to 17 and Comparative Examples 7 and 8 were used instead of the liquid crystal material of Example 1.

(Electric Field Response, High Temperature and High Humidity Test, and Observation of Generation of Bright Spot)

The observation of the electric field response, the high temperature and high humidity test, and the observation of generation of bright spots of the liquid crystal cells of Example 14 and the like were performed in the same manner as in Example 1. The results are shown in Table 4.

TABLE 4

| | LIQUID CRYSTAL MATERIAL (COMPOSITION) | | 0 HOUR | | | AFTER 1000 HOURS | |
|---|---|---|---|---|---|---|---|
| | Tni (° C.) | LIQUID CRYSTAL COMPOUND (wt %) | ELECTRIC FIELD RESPONSE | VHR (%) | FINE BRIGHT SPOT | VHR (%) | FINE BRIGHT SPOT |
| COMPARATIVE EXAMPLE 7 | 60 | CHEMICAL FORMULA (27) 5 wt % | YES | 99.5 | NONE | 97.5 | NONE |
| COMPARATIVE EXAMPLE 8 | 70 | CHEMICAL FORMULA (27) 5 wt % | YES | 99.5 | NONE | 97.7 | NONE |
| EXAMPLE 14 | 80 | CHEMICAL FORMULA (27) 5 wt % | YES | 99.5 | NONE | 98.8 | NONE |
| EXAMPLE 15 | 90 | CHEMICAL FORMULA (27) 5 wt % | YES | 99.5 | NONE | 99.1 | NONE |
| EXAMPLE 16 | 100 | CHEMICAL FORMULA (27) 5 wt % | YES | 99.5 | NONE | 99.1 | NONE |
| EXAMPLE 17 | 110 | CHEMICAL FORMULA (27) 5 wt % | YES | 99.5 | NONE | 99.4 | NONE |

The liquid crystal cells of Examples 14 to 17 and Comparative Examples 7 and 8 did not contain the liquid crystal compound containing the structure represented by the chemical formula (9) (ether structure) in the liquid crystal material, and thus fine bright spots were not generated even after 1000 hours. However, the obtained results indicated that, the lower the Tni of the liquid crystal material, the lower the VHR after 1000 hours. It is supposed that this was caused because a slight amount of moisture, intruding into the liquid crystal layer, is more easily diffused in the liquid crystal layer in a high temperature environment (60° C. environment) as Tni of the liquid crystal material decreases, and an amount of ions in the liquid crystal layer is increased as Tni decreases, although the level difference is slight.

Example 18

An alignment agent of Example 18 was prepared in the same manner as in Example 1 except that a polyimide polymer having a cyclobutane ring represented by the chemical formula (2) with the degree of imidization of 70% was used.

In the chemical formula (2), p is any integer. In the chemical formula (2), X includes a structure having a cyclobutane ring represented by the following chemical formula (3-2); and Y has a structure represented by the following chemical formula (4-2). In the chemical formula (4-2), h is an integer of 0 to 3.

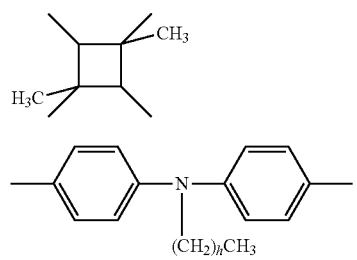

(3-2)

(4-2)

A liquid crystal material of Example 18 was prepared in the same manner as in Example 1 except that the content of the polar compound represented by the chemical formula (27) was changed to 10% by mass, and Tni (° C.) was adjusted to 100° C. An FFS mode liquid crystal cell of Example 18 was fabricated in the same manner as in Example 1 except that the alignment agent and the liquid crystal material of Example 18 were used.

Example 19

A liquid crystal material of Example 19 was prepared in the same manner as in Example 1 except that a polar liquid crystal compound represented by the following chemical formula (36), instead of the compound represented by the chemical formula (27), was used in a content of 10% by mass, and Tni (° C.) was adjusted to 100° C. An FFS mode liquid crystal cell of Example 19 was fabricated in the same manner as in Example 1 except that the alignment agent of Example 18 and the liquid crystal material of Example 19 were used. In the chemical formula (36), n is an integer of 1 to 6.

(36)

Comparative Examples 9 to 12

Liquid crystal materials of Comparative Examples 9 to 12 were fabricated in the same manner as in Example 1 except that compounds represented by the following chemical formula (37) to chemical formula (40), instead of the compound represented by the chemical formula (27), were used in a content of 10% by mass, and Tni (° C.) was adjusted to 100° C. FFS mode liquid crystal cells of Comparative Examples 9 to 12 were fabricated in the same manner as in Example 1 except that the alignment agent of Example 18 and the liquid crystal materials of Comparative Examples 9 to 12 were used. In the following chemical formula (37) to chemical formula (40), n is an integer of 1 to 6; and in the chemical formula (40), m is independent from n, and is an integer of 1 to 6.

(37)

(38)

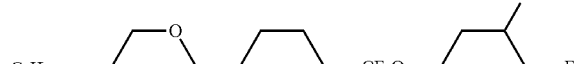

(39)

(40)

(Electric Field Response, High Temperature and High Humidity Test, and Observation of Generation of Bright Spot)

The observation of the electric field response, the high temperature and high humidity test, and the observation of generation of bright spots of the liquid crystal cells of Example 18 and the like were performed in the same manner as in Example 1. The results are shown in Table 5.

In Comparative Examples 9 to 11, even if the liquid crystal compound had a group: —$CF_2$—O-Ph, if the structure represented by the chemical formula (9) (ether structure) was contained in the same liquid crystal compound, fine bright spots were generated in a slight amount after 1000 hours, and the lowering of the VHR was observed. It is supposed that this was caused because the structure part represented by the chemical formula (9) in the liquid crystal compound was reacted with the moisture, intruding into the liquid crystal layer, to be cleaved, and the cleaved component formed hydrogen bond with the decomposition product of the photo-alignment film eluted into the liquid crystal layer, whereby the decomposition product of the photo-alignment film was stabilized.

In Comparative Example 12, it is also supposed that because the liquid crystal compound had the structure represented by the chemical formula (9), the structure part was cleaved by the moisture intruding into the liquid crystal layer, whereby fine bright spots were generated and the lowering of the VHR was observed, as in Comparative Example 9 and the like.

In Examples 18 and 19, the generation of fine bright spots and the lowering of the VHR were not observed.

The invention claimed is:

1. A liquid crystal cell comprising:
   a pair of substrates, which face each other and have a photo-alignment film on at least one facing surface; and
   a liquid crystal layer interposed between the substrates, wherein
   a liquid crystal material forming the liquid crystal layer contains a liquid crystal compound having a structure selected from the group consisting of chemical formula (1-1) and chemical formula (1-2),
   the photo-alignment film is obtained by subjecting a polymer film including a polyimide polymer having a cyclobutane ring structure to a photo-alignment treatment:

$$A_1\text{-}C_nF_{2n}\text{—}X_1\text{-}A_2 \qquad (1\text{-}1)$$

$$A_1\text{-}X_1\text{—}C_nF_{2n+1} \qquad (1\text{-}2)$$

in the chemical formula (1-1) and chemical formula (1-2), $A_1$ is a phenyl group, a phenylene group, a naphthyl

TABLE 5

| | LIQUID CRYSTAL MATERIAL (COMPOSITION) | | 0 HOUR | | | AFTER 1000 HOURS | |
|---|---|---|---|---|---|---|---|
| | Tni (° C.) | LIQUID CRYSTAL COMPOUND (wt %) | ELECTRIC FIELD RESPONSE | VHR (%) | FINE BRIGHT SPOT | VHR (%) | FINE BRIGHT SPOT |
| EXAMPLE 18 | 100 | CHEMICAL FORMULA (27) 10 wt % | YES | 99.5 | NONE | 99.2 | NONE |
| EXAMPLE 19 | 100 | CHEMICAL FORMULA (36) 10 wt % | YES | 99.5 | NONE | 99.2 | NONE |
| COMPARATIVE EXAMPLE 9 | 100 | CHEMICAL FORMULA (37) 10 wt % | YES | 99.5 | NONE | 97.2 | GENERATED (SMALL NUMBER) |
| COMPARATIVE EXAMPLE 10 | 100 | CHEMICAL FORMULA (38) 10 wt % | YES | 99.5 | NONE | 97.8 | GENERATED (SMALL NUMBER) |
| COMPARATIVE EXAMPLE 11 | 100 | CHEMICAL FORMULA (39) 10 wt % | YES | 99.5 | NONE | 97.8 | GENERATED (SMALL NUMBER) |
| COMPARATIVE EXAMPLE 12 | 100 | CHEMICAL FORMULA (40) 10 wt % | NO | 99.5 | NONE | 96.1 | GENERATED | group, a naphthylene group, a cyclohexyl group, or a cyclohexylene group; $A_2$ is a phenyl group, a phenylene group, a naphthyl group, or a naphthylene group, provided that a hydrogen atom in functional groups $A_1$ and $A_2$ is optionally substituted by a fluoro group, a chloro group, a bromo group, a methyl group, or an ethyl group; $X_1$ is an oxygen atom or a direct bond; and n is an integer of 1 to 6, and the photo-alignment film further comprises a (meth)acrylamide polymer.

2. The liquid crystal cell according to claim 1, wherein the polyimide polymer utilized for the photo-alignment film includes a polymer represented by the following chemical formula (2):

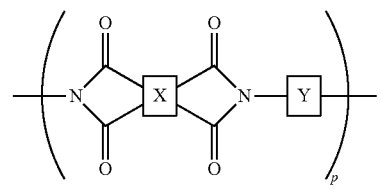
(2)

in the chemical formula (2), p is a degree of polymerization and an integer of 1 or more; X has a structure represented by the following chemical formula (3-1) or chemical formula (3-2); and Y has a structure represented by any of chemical formula (4-1) to chemical formula (4-12):

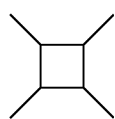
(3-1)

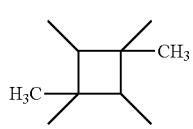
(3-2)

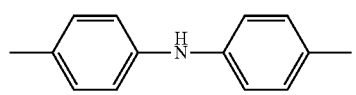
(4-1)

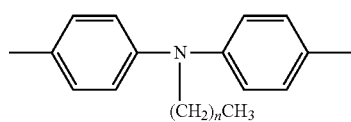
(4-2)

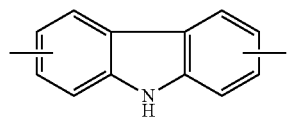
(4-3)

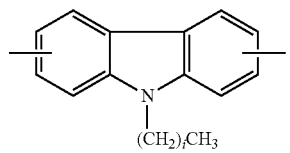
(4-4)

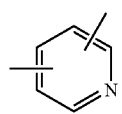
(4-5)

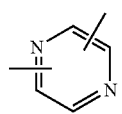
(4-6)

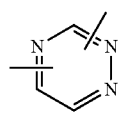
(4-7)

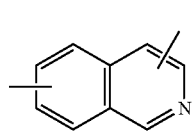
(4-8)

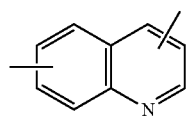
(4-9)

-continued

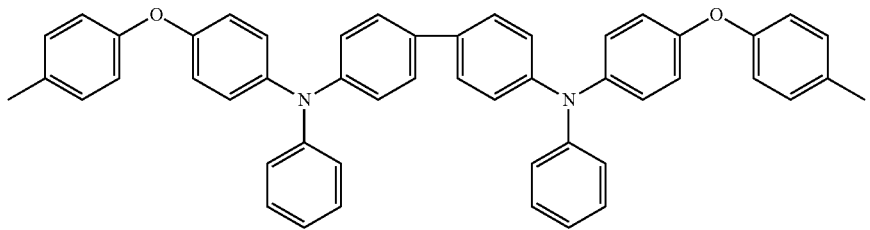
(4-10)

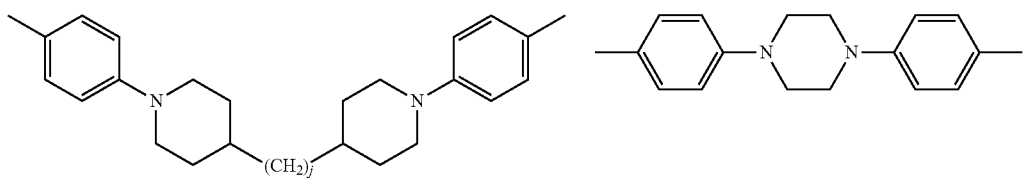
(4-11)                                    (4-12)

in the chemical formula (4-2), h is an integer of 0 to 3; i is an integer of 0 to 3; and j is an integer of 0 to 3.

3. The liquid crystal cell according to claim 2, wherein in the chemical formula (2), X has a structure represented by the chemical formula (3-1) and Y has a structure represented by any of the chemical formula (4-1) and the chemical formula (4-2).

4. The liquid crystal cell according to claim 1, wherein the (meth)acrylamide polymer includes a polymer selected from the group consisting of chemical formula (5-1) and chemical formula (5-2):

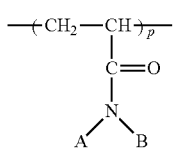
(5-1)

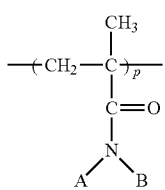
(5-2)

in the chemical formula (5-1) and chemical formula (5-2), A and B are independent from each other and are each H, $-C_nC_{2n+1}$ where n is an integer of 1 to 3, $-(CH_2)_mNX_2Y_2$ where m is an integer of 1 to 6, $X_2$ and $Y_2$ are independent from each other and are each H or $-C_zH_{2z+1}$ where z is an integer of 1 to 3, or $-(CH_2)_mOH$; and p is a degree of polymerization and an integer of 1 or more.

5. The liquid crystal cell according to claim 1, wherein the (meth)acrylamide polymer includes a polymer selected from the group consisting of chemical formula (6-1), chemical formula (6-2), and chemical formula (6-3):

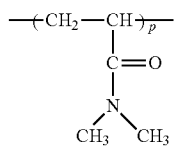
(6-1)

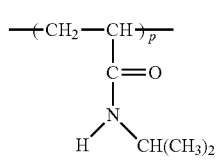
(6-2)

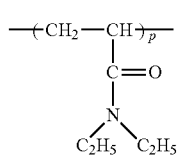
(6-3)

in the chemical formula (6-1) to chemical formula (6-3), p is a degree of polymerization and an integer of 1 or more.

6. The liquid crystal cell according to claim 1, wherein the (meth)acrylamide polymer is contained in a content (% by mass) of more than 0% by mass and less than 30% by mass relative to 100% by mass of a total of the polyimide polymer and the (meth)acrylamide polymer.

7. The liquid crystal cell according to claim 1, wherein the liquid crystal compound has a structure selected from the group consisting of chemical formula (7-1), chemical formula (7-2), and chemical formula (7-3):

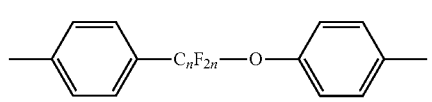
(7-1)

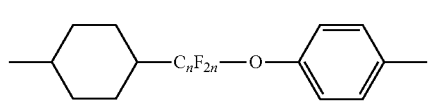
(7-2)

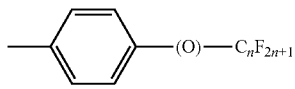
(7-3)

in the chemical formula (7-1) to chemical formula (7-3), the hydrogen atom in the phenyl group or the cyclohexyl group is optionally substituted by a fluoro group, a chloro group, a bromo group, a methyl group, or an ethyl group; and n is an integer of 1 to 6.

8. The liquid crystal cell according to claim 1, wherein the liquid crystal compound includes a compound represented by the following chemical formula (8):

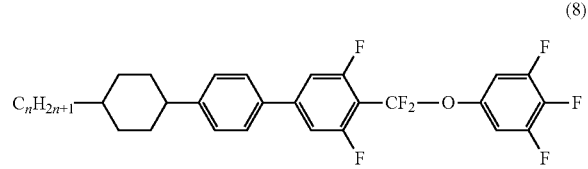
(8)

in the chemical formula (8), n is an integer of 0 to 15.

9. The liquid crystal cell according to claim 1, wherein the liquid crystal material forming the liquid crystal layer has a Tni of 80° C. or higher and 110° C. or lower.

10. The liquid crystal cell according to claim 1, wherein the liquid crystal compound utilized for the liquid crystal material does not include a structure represented by the following chemical formula (9):

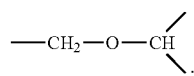
(9)

11. The liquid crystal cell according to claim 1, wherein the photo-alignment film includes a horizontal photo-alignment film, which horizontally or substantially horizontally aligns the liquid crystal compound relative to a substrate surface of the substrate.

12. The liquid crystal cell according to claim 1, wherein the liquid crystal cell has a display mode of any of TN, ECB, IPS, and FFS.

13. The liquid crystal cell according to claim 1, further comprising a sealing material interposed between the substrates in a state of surrounding the liquid crystal layer, wherein
the sealing material includes a polymer of an epoxy monomer and a polymer of a (meth)acrylic monomer.

14. A liquid crystal display comprising the liquid crystal cell according to claim 1.

* * * * *